US012229467B2

(12) United States Patent
Iyer et al.

(10) Patent No.: US 12,229,467 B2
(45) Date of Patent: Feb. 18, 2025

(54) INTELLIGENT ORCHESTRATION OF VIDEO OR IMAGE MIRRORING USING A PLATFORM FRAMEWORK

(71) Applicant: Dell Products, L.P., Round Rock, TX (US)

(72) Inventors: Vivek Viswanathan Iyer, Austin, TX (US); Michael S. Gatson, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 17/392,380

(22) Filed: Aug. 3, 2021

(65) Prior Publication Data

US 2023/0037463 A1  Feb. 9, 2023

(51) Int. Cl.
*G06F 3/14* (2006.01)
*G06F 3/0481* (2022.01)
*G06F 9/54* (2006.01)
*G06F 21/50* (2013.01)

(52) U.S. Cl.
CPC .......... *G06F 3/1454* (2013.01); *G06F 3/0481* (2013.01); *G06F 3/1415* (2013.01); *G06F 9/547* (2013.01); *G06F 21/50* (2013.01); *G06F 2221/032* (2013.01)

(58) Field of Classification Search
CPC ...... G06F 3/1423; G06F 3/04845; G06F 3/14; G06F 3/147; H04N 5/2628; H04N 7/183; H04N 7/181; H04N 5/23238; H04N 5/45; H04N 1/3876
See application file for complete search history.

(56) References Cited

U.S. PATENT DOCUMENTS

| | | | | |
|---|---|---|---|---|
| 5,469,536 A * | 11/1995 | Blank | ................. | H04N 1/3873 345/594 |
| 11,158,028 B1 * | 10/2021 | Melamed | .............. | G06F 3/0488 |
| 11,182,879 B1 * | 11/2021 | Haslam | ................ | G06V 40/172 |
| 11,317,060 B1 * | 4/2022 | Libin | .................... | H04N 7/157 |
| 11,599,322 B1 * | 3/2023 | Johnson | ................. | G06F 3/038 |
| 2008/0268899 A1 * | 10/2008 | Lee | ................... | H04N 5/232933 348/14.02 |
| 2009/0005162 A1 * | 1/2009 | Itoh | ........................ | A63F 13/21 463/31 |
| 2013/0314302 A1 * | 11/2013 | Jeung | ...................... | G06F 3/1454 345/2.3 |
| 2015/0058450 A1 * | 2/2015 | Hahm | ...................... | H04L 67/38 709/219 |
| 2015/0067549 A1 * | 3/2015 | Chang | ................... | G06F 3/0488 715/761 |

(Continued)

*Primary Examiner* — William Boddie
*Assistant Examiner* — Alecia D English
(74) *Attorney, Agent, or Firm* — Fogarty LLP

(57) ABSTRACT

Embodiments of systems and methods for methods for the intelligent orchestration of video or image mirroring using a platform framework are described. In some embodiments, an Information Handling System (IHS) may include a processor and a memory coupled to the processor, the memory having program instructions stored thereon that, upon execution, cause the IHS to: receive a notification, via a platform framework, of a communication session; and in response to the notification, apply a video or image mirroring operation, via the platform framework, to at least a portion of content shared during the communication session.

19 Claims, 11 Drawing Sheets

(56) References Cited

U.S. PATENT DOCUMENTS

| | | | |
|---|---|---|---|
| 2015/0189178 A1* | 7/2015 | Lombardi | H04N 23/63 |
| | | | 348/207.99 |
| 2015/0256764 A1* | 9/2015 | Besson | H04N 5/2628 |
| | | | 348/143 |
| 2015/0281769 A1* | 10/2015 | Chiu | H04N 21/47 |
| | | | 348/564 |
| 2016/0014264 A1* | 1/2016 | Yim | H04M 1/67 |
| | | | 455/411 |
| 2017/0060817 A1* | 3/2017 | Dhaundiyal | G06T 3/40 |
| 2017/0150046 A1* | 5/2017 | Sondhi | H04N 23/698 |
| 2017/0259165 A1* | 9/2017 | Prentice | A63F 9/10 |
| 2018/0205983 A1* | 7/2018 | Lee | H04N 21/41265 |
| 2020/0379703 A1* | 12/2020 | Choi | G06F 3/1454 |
| 2021/0075977 A1* | 3/2021 | Yoo | H04N 5/272 |
| 2021/0150245 A1* | 5/2021 | Liu | G06V 10/56 |
| 2021/0405865 A1* | 12/2021 | Faulkner | H04N 7/147 |

* cited by examiner

INTELLIGENT ORCHESTRATION OF VIDEO OR IMAGE MIRRORING USING A PLATFORM FRAMEWORK

FIELD

The present disclosure relates generally to Information Handling Systems (IHSs), and more particularly, to systems and methods for the intelligent orchestration of video or image mirroring using a platform framework.

BACKGROUND

As the value and use of information continue to increase, individuals and businesses seek additional ways to process and store it. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Embodiments of systems and methods for the intelligent orchestration of digital watermarking using a platform framework are described. In an illustrative, non-limiting embodiment, an Information Handling System (IHS) may include a processor and a memory coupled to the processor, the memory having program instructions stored thereon that, upon execution, cause the IHS to: receive a notification, via a platform framework, of a communication session; and in response to the notification, apply a video or image mirroring operation, via the platform framework, to at least a portion of content shared during the communication session.

The communication session may include at least one of: a video communication, a broadcast, a virtual conference, or a remote meeting. The content may include at least one of: a live video feed, a recorded video, a virtual background, a watermark, a shared desktop, a shared application window, or a shared document. To apply the video or image mirroring operation, the program instructions, upon execution, may cause the IHS to apply a left-to-right or a right-to-left flip to the portion of the content.

In some cases, to apply the video or image mirroring operation, the program instructions, upon execution, may cause the IHS to determine whether to enforce a video or image mirroring policy based, at least in part, upon context. The context may include at least one of: a classification of the content, an identity or role of an originator of the content, a type of the communication session, an identification or proximity of a participant of the communication session, an IHS location, an IHS posture, a determination of whether a camera source is front-facing or rear-facing with respect to the IHS, or an identification of a communication application configured to establish the communication session.

The notification may be provided by a communication application registered with the platform framework via an Application Programming Interface (API), and application of the video or image mirroring operation may be initiated by an optimizer application registered with the platform framework via the API.

In another illustrative non-limiting embodiment, a memory storage device may have program instructions stored thereon that, upon execution by an IHS, cause the IHS to: identify a video or image mirroring policy; and enforce the video or image mirroring policy, via a platform framework, during a communication session.

To enforce the video or image mirroring policy, the program instructions, upon execution, may cause the IHS to apply a left-to-right or a right-to-left operation to content shared during the communication session based on context. The context may include at least one of: a classification of the content, an identity or role of an originator of the content, a type of the communication session, an identification of a participant of the communication session, a proximity of the participant to the IHS, an IHS location, an IHS posture, a determination of whether a camera source is front-facing or rear-facing with respect to the IHS, or an identification of a communication application configured to establish the communication session.

In yet another illustrative, non-limiting embodiment, a method may include identifying a video or image mirroring policy applicable to a communication session; and enforcing the video or image mirroring policy with respect to content shared during the communication session. Enforcing the video or image mirroring policy may include selecting between a left-to-right or a right-to-left operation to at least a portion of the content based on context. The context may include at least one of: a classification of the content, an identity or role of an originator of the content, a type of the communication session, an identification of a participant of the communication session, a proximity of the participant, a location, a posture, a determination of whether a camera source is front-facing or rear-facing, or an identification of a communication application configured to establish the communication session.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

In this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
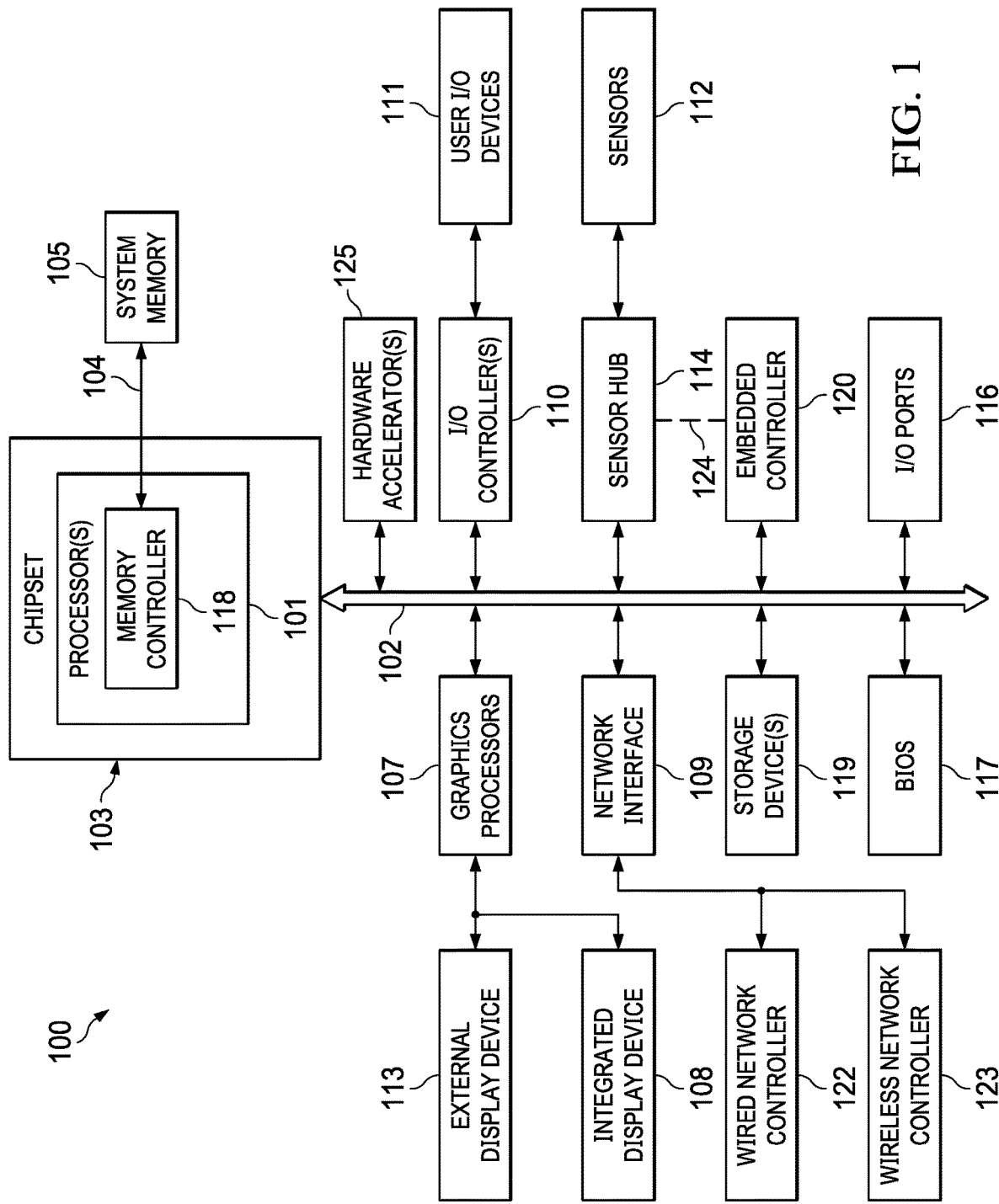
FIG. 1 is a block diagram of an example of hardware components of an Information Handling System (IHS), according to some embodiments.

FIG. 1 is a block diagram illustrating components of IHS 100 configured according to some embodiments. As shown, IHS 100 includes one or more processor(s) 101, such as a Central Processing Unit (CPU), that execute code retrieved from system memory 105.

Although IHS 100 is illustrated with a single processor, other embodiments may include two or more processors, that may each be configured identically, or to provide specialized processing operations. Processor(s) 101 may include any processor capable of executing instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, processor(s) 101 includes integrated memory controller 118 that may be implemented directly within its circuitry. Alternatively, memory controller 118 may be a separate integrated circuit that is located on the same die as processor(s) 101. Memory controller 118 may be configured to manage the transfer of data to and from system memory 105 of IHS 100 via high-speed memory interface 104.

System memory 105 is coupled to processor(s) 101 and provides processor(s) 101 with a high-speed memory that may be used in the execution of computer program instructions. For example, system memory 105 may include memory components, such as static RAM (SRAM), dynamic RAM (DRAM), NAND Flash memory, suitable for supporting high-speed memory operations by the processor 101. In certain embodiments, system memory 105 may combine both persistent, non-volatile, and volatile memor(ies). In certain embodiments, system memory 105 may include multiple removable memory modules.

IHS 100 utilizes chipset 103 that may include one or more integrated circuits coupled to processor(s) 101. In this embodiment, processor(s) 101 is depicted as a component of chipset 103. In other embodiments, all of chipset 103, or portions of chipset 103 may be implemented directly within the integrated circuitry of processor(s) 101. Chipset 103 provides processor(s) 101 with access to a variety of resources accessible via bus 102.

In IHS 100, bus 102 is illustrated as a single element. However, other embodiments may utilize any number of separate buses to provide the illustrated pathways served by bus 102.

In various embodiments, IHS 100 may include one or more I/O ports 116 that may support removeable couplings with various types of external devices and systems, including removeable couplings with peripheral devices that may be configured for operation by a particular user of IHS 100. For instance, I/O 116 ports may include USB (Universal Serial Bus) ports, by which a variety of external devices may be coupled to IHS 100. In addition to, or instead of USB ports, I/O ports 116 may include various types of physical I/O ports that are accessible to a user via an enclosure or chassis of IHS 100.

In certain embodiments, chipset 103 may additionally utilize one or more I/O controllers 110 that may each support the operation of hardware components such as user I/O devices 111. User I/O devices 111 may include peripheral components that are physically coupled to I/O port 116 and/or peripheral components wirelessly coupled to IHS 100 via network interface 109.

In various implementations, I/O controller 110 may support the operation of one or more user I/O devices 110 such as a keyboard, mouse, touchpad, touchscreen, microphone, speakers, camera and other input and output devices that may be coupled to IHS 100. User I/O devices 111 may interface with an I/O controller 110 through wired or wireless couplings supported by IHS 100. In some cases, I/O controllers 110 may support configurable operation of supported peripheral devices, such as user I/O devices 111.

As illustrated, a variety of additional resources may be coupled to processor(s) 101 of IHS 100 through chipset 103. For instance, chipset 103 may be coupled to network interface 109 to enable different types of network connectivity. IHS 100 may also include one or more Network Interface Controllers (NICs) 122 and 123, each of which may implement the hardware required for communicating via a specific networking technology, such as Wi-Fi, BLUETOOTH, Ethernet and mobile cellular networks (e.g., CDMA, TDMA, LTE).

Network interface 109 may support network connections by wired network controller(s) 122 and wireless network controller(s) 123. Each network controller 122 and 123 may be coupled via various buses to chipset 103 to support different types of network connectivity, such as the network connectivity utilized by IHS 100.

Chipset 103 may also provide access to one or more display device(s) 108 and/or 113 via graphics processor(s) 107. Graphics processor(s) 107 may be included within a video card, graphics card, and/or an embedded controller installed within IHS 100. Additionally, or alternatively, graphics processor(s) 107 may be integrated within processor(s) 101, such as a component of a system-on-chip (SoC). Graphics processor(s) 107 may generate display information and provide the generated information to display device(s) 108 and/or 113.

One or more display devices 108 and/or 113 are coupled to IHS 100 and may utilize LCD, LED, OLED, or other display technologies (e.g., flexible displays, etc.). Each display device 108 and 113 may be capable of receiving touch inputs such as via a touch controller that may be an embedded component of the display device 108 and/or 113 or graphics processor(s) 107, for example, or may be a separate component of IHS 100 accessed via bus 102. In some cases, power to graphics processor(s) 107, integrated display device 108 and/or external display 133 may be turned off or configured to operate at minimal power levels in response to IHS 100 entering a low-power state (e.g., standby).

As illustrated, IHS 100 may support integrated display device 108, such as a display integrated into a laptop, tablet, 2-in-1 convertible device, or mobile device. IHS 100 may also support use of one or more external displays 113, such as external monitors that may be coupled to IHS 100 via various types of couplings, such as by connecting a cable from the external display 113 to external I/O port 116 of the IHS 100, via wireless docking station, etc. In certain scenarios, the operation of integrated displays 108 and external displays 113 may be configured for a particular user. For instance, a particular user may prefer specific brightness settings that may vary the display brightness based on time of day and ambient lighting conditions.

Chipset 103 also provides processor(s) 101 with access to one or more storage devices 119. In various embodiments, storage device 119 may be integral to IHS 100 or may be external to IHS 100. Moreover, storage device 119 may be accessed via a storage controller that may be an integrated component of the storage device.

Generally, storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud system or enterprise data management system that is accessible via network interface 109.

As illustrated, IHS 100 also includes Basic Input/Output System (BIOS) 117 that may be stored in a non-volatile memory accessible by chipset 103 via bus 102. Upon powering or restarting IHS 100, processor(s) 101 may utilize BIOS 117 instructions to initialize and test hardware components coupled to the IHS 100. Under execution, BIOS 117 instructions may facilitate the loading of an operating system (OS) (e.g., WINDOWS, MACOS, iOS, ANDROID, LINUX, etc.) for use by IHS 100.

BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

As illustrated, certain IHS 100 embodiments may utilize sensor hub 114 (e.g., INTEL Sensor Hub or "ISH," etc.) capable of sampling and/or collecting data from a variety of hardware sensors 112. For instance, sensors 112, may be disposed within IHS 100, and/or display 110, and/or a hinge coupling a display portion to a keyboard portion of IHS 100, and may include, but are not limited to: electric, magnetic, hall effect, radio, optical, infrared, thermal, force, pressure, touch, acoustic, ultrasonic, proximity, position, location, angle (e.g., hinge angle), deformation, bending (e.g., of a flexible display), orientation, movement, velocity, rotation, acceleration, bag state (in or out of a bag), and/or lid sensor(s) (open or closed).

In some cases, one or more sensors 112 may be part of a keyboard or other input device. Processor(s) 101 may be configured to process information received from sensors 112 through sensor hub 114, and to perform methods for prioritizing the pre-loading of applications with a constrained memory budget using contextual information obtained from sensors 112.

For instance, during operation of IHS 100, the user may open, close, flip, swivel, or rotate display 108 to produce different IHS postures. In some cases, processor(s) 101 may be configured to determine a current posture of IHS 100 using sensors 112 (e.g., a lid sensor, a hinge sensor, etc.). For example, in a dual-display IHS implementation, when a first display 108 (in a first IHS portion) is folded against a second display 108 (in a second IHS portion) so that the two displays have their backs against each other, IHS 100 may be said to have assumed a book posture. Other postures may include a table posture, a display posture, a laptop posture, a stand posture, or a tent posture, depending upon whether IHS 100 is stationary, moving, horizontal, resting at a different angle, and/or its orientation (landscape vs. portrait).

For instance, in a laptop posture, a first display surface of a display 108 may be facing the user at an obtuse angle with respect to a second display surface of a display 108 or a physical keyboard portion. In a tablet posture, a first display surface may be at a straight angle with respect to a second display surface or a physical keyboard portion. And, in a book posture, a first display surface may have its back (e.g., chassis) resting against the back of a second display surface or a physical keyboard portion.

It should be noted that the aforementioned postures and their various respective keyboard states are described for sake of illustration only. In different embodiments, other postures may be used, for example, depending upon the type of hinge coupling the displays, the number of displays used, or other accessories.

In other cases, processor(s) 101 may process user presence data received by sensors 112 and may determine, for example, whether an IHS's end-user is present or absent. Moreover, in situations where the end-user is present before IHS 100, processor(s) 101 may further determine a distance of the end-user from IHS 100 continuously or at predetermined time intervals. The detected or calculated distances may be used by processor(s) 101 to classify the user as being in the IHS's near-field (user's position<threshold distance A), mid-field (threshold distance A<user's position<threshold distance B, where B>A), or far-field (user's position>threshold distance C, where C>B) with respect to IHS 100 and/or display 108.

More generally, in various implementations, processor(s) 101 may receive and/or produce context information using sensors 112 via sensor hub 114, including one or more of, for example: a user's presence or proximity state (e.g., present, near-field, mid-field, far-field, and/or absent using a Time-of-Flight or "ToF" sensor, visual image sensor, infrared sensor, and/or other suitable sensor 112), a facial expression of the user (e.g., usable for mood or intent classification), a direction and focus of the user's gaze, a user's hand gesture, a user's voice, an IHS location (e.g., based on the location of a wireless access point or Global Positioning System, etc.), IHS movement (e.g., from an accelerometer or gyroscopic sensor), lid state (e.g., of a laptop or other hinged form factor), hinge angle (e.g., in degrees), IHS posture (e.g., laptop, tablet, book, tent, display, etc.), whether the IHS is coupled to a dock or docking station (e.g., wired or wireless), a distance between the user and at least one of: the IHS, the keyboard, or a display coupled to the IHS, a type of keyboard (e.g., a physical keyboard integrated into IHS 100, a physical keyboard external to IHS 100, or an on-screen keyboard), whether the user operating the keyboard is typing with one or two hands (e.g., by determine whether or not the user is holding a stylus, or the like), a time of day, software application(s) under execution in focus for receiving keyboard input, whether IHS 100 is inside or outside of a carrying bag or case, a level of ambient lighting, a battery charge level, whether IHS 100 is operating from battery power or is plugged into an AC power source (e.g., whether the IHS is operating in AC-only mode, DC-only mode, or AC+DC mode), a power mode or rate of power consumption of various components of IHS 100 (e.g., CPU 101, GPU 107, system memory 105, etc.), etc.

In certain embodiments, sensor hub 114 may be an independent microcontroller or other logic unit that is coupled to the motherboard of IHS 100. Sensor hub 114 may be a component of an integrated system-on-chip incorporated into processor(s) 101, and it may communicate with chipset 103 via a bus connection such as an Inter-Integrated Circuit ($I^2C$) bus or other suitable type of bus connection. Sensor hub 114 may also utilize an $I^2C$ bus for communicating with various sensors supported by IHS 100.

As illustrated, IHS 100 may utilize embedded controller (EC) 120, which may be a motherboard component of IHS 100 and may include one or more logic units. In certain embodiments, EC 120 may operate from a separate power plane from the main/host processor(s) 101 and thus the OS operations of IHS 100. Firmware instructions utilized by EC 120 may be used to operate a secure execution system that may include operations for providing various core functions of IHS 100, such as power management, management of operating modes in which IHS 100 may be physically configured and support for certain integrated I/O functions. In some embodiments, EC 120 and sensor hub 114 may communicate via an out-of-band signaling pathway or bus 124.

In various embodiments, chipset 103 may provide processor 101 with access to hardware accelerator(s) 125. Examples of hardware accelerator(s) 125 may include, but are not limited to, INTEL's Gaussian Neural Accelerator (GNA), Audio and Contextual Engine (ACE), Vision Processing Unit (VPU), Deep Neural Network (DNN), etc. In some cases, hardware accelerator(s) 125 may be used to perform ML and/or AI operations offloaded by processor 101. For instance, hardware accelerator(s) 125 may load several audio signatures and/or settings, and it may identify an audio source by comparing an audio input to one or more audio signatures until it finds a match. Hardware accelerator(s) 125 may also apply one or more video processing operations to a video input or workload, for example, by instantiating aspects of, or executing commands from, a media foundation engine, a communication or collaboration application, or the like.

In some cases, however, hardware accelerator(s) 125 may have significant model concurrency and/or processing latency constraints relative to processor(s) 101. Accordingly, in some cases, context information may be used to select a subset and/or size of data signatures (e.g., audio), also number and/or complexity of models, number of concurrent models (e.g., only two or three models can be processed at a time), and/or latency characteristics (e.g., with four models or more, detection latency becomes unacceptable) of hardware accelerator(s) 125.

In various embodiments, IHS 100 may not include each of the components shown in FIG. 1. Moreover, IHS 100 may include various other components in addition to those that are shown in FIG. 1. Some components that are represented as separate components in FIG. 1 may be integrated with other components. For example, in some implementations, all or a portion of the features provided by the illustrated components may instead be provided by an SoC.

In a conventional IHS, each application would have to know how to communicate with each specific hardware endpoint 101-124 it needs, which can place a heavy burden on software developers. Moreover, in many situations, multiple applications may request the same information from the same hardware endpoint, thus resulting in inefficiencies due to parallel and/or overlapping code and execution paths used by these applications to perform get and set methods with that same endpoint.

To address these, and other concerns, a platform framework as described herein may enable an overall, comprehensive system management orchestration of IHS 100. Particularly, such a platform framework may provide, among other features, the scalability of multiple applications requesting direct hardware endpoint (e.g., 101-124) access. Additionally, or alternatively, a platform framework as described herein may provide performance optimizations and increased operational stability to various IHS environments.

Figure 2:
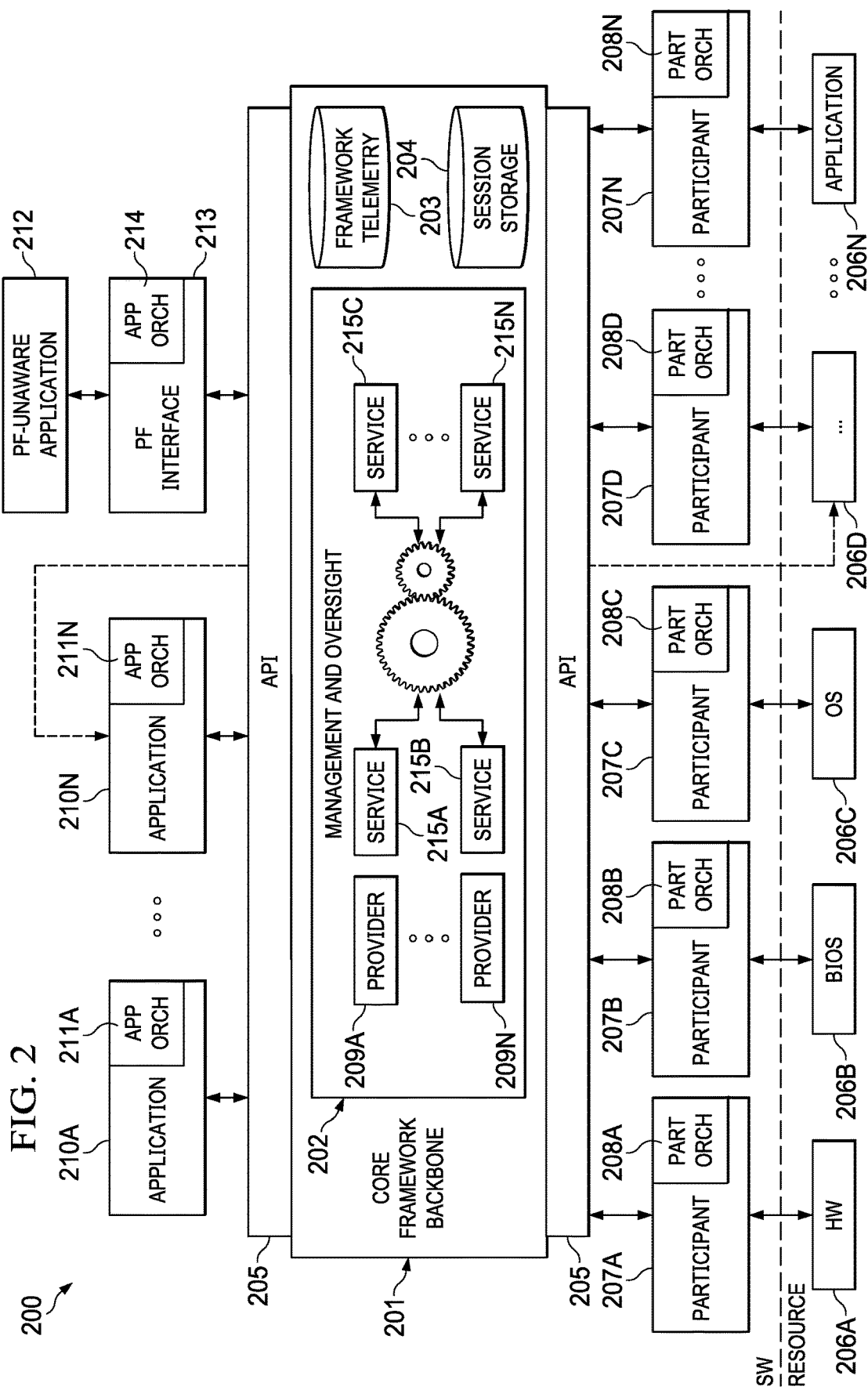
FIG. 2 is a block diagram illustrating an example of a platform framework deployed in an IHS, according to some embodiments.

FIG. 2 is a block diagram illustrating an example of platform framework 200. In some embodiments, IHS 100 may instantiate each element of platform framework 200 through the execution of program instructions, stored in a memory (e.g., system memory 105, storage device(s) 119, etc.), by one or more processors or controllers (e.g., processor(s) 101, GPU 107, hardware accelerators, etc.).

In some implementations, platform framework 200 may be supported by and/or executed within an OS used by IHS 100, and it may be scaled across user and kernel spaces. Additionally, or alternatively, platform framework 200 may be provided as a software library or an ".exe" file.

As shown, platform framework 200 includes core framework backbone 201 and Application Programming Interface (API) 205. Core framework backbone 201 includes management and oversight engine 202 (with services 215A-N), framework telemetry database 203, and session storage database 204.

In operation, platform framework 200 enables the management and orchestration of its participants' communications. The term "participant," as used herein, refers to any entity (e.g., hardware device driver, software module, etc.) configured to register with platform framework 200 by issuing a registration command to management and oversight engine 202 via API 205. Upon registration, each participant may receive a handle usable by services 215A-N within management and oversight engine 202 (and other participants) to address it. In some cases, the handle may be validated by Root-of-Trust (RoT) hardware (e.g., EC 120) as part of the participant registration process.

In various embodiments, platform framework 200 may include at least three different types of participants: producers, consumers, and providers.

Producers are entities (e.g., 207A-N) configured to advertise or publish the capabilities (e.g., variables, primitives, etc.) and statuses of associated hardware (e.g., 206A) or software components (e.g., 206N) to platform framework 200 via API 205, which can then be consumed and/or modified by other participants (e.g., 210A-N). Producers (e.g., 207A-N) may also execute operations with respect to associated hardware components (e.g., 206A-N) based upon instructions (e.g., "set" commands) received from other participants (e.g., 210A-N) via API 205.

On the producer side, resources 206A-N may include, for example, hardware 206A, BIOS 206B, OS 206C, application 206D (a producer role for consumer application 210N), and application 206N (a producer-only application). Each of resources 206A-N may have a producer driver or module 207A-N (a "producer") associated therewith, and each such producer 207A-N may have corresponding orchestrator logic 208A-N that enables its registration and subsequent communications with platform framework 200 via API 205. Once registered, producers 207A-N may provide information to platform framework 200 on their own, upon request by management and oversight engine 202, and/or upon request by any consumer (e.g., 210A-N).

Consumers are entities (e.g., 210A-N) that retrieve data (e.g., a single data item, a collection of data items, data subscribed to from selected producers, etc.) from platform framework 200 using API 205 to then perform one or more actions.

On the consumer side, each of consuming applications 210A-N (a "consumer") may have a corresponding orchestrator logic 211A-N that also enables registration and subsequent communications with platform framework 200 using API 205. For example, applications 210A-N may use API 205 commands request data via platform framework 200 from any registered producer 207A-N or provider 209A-N. In the case of application 212 that is not natively aware of, or compliant with, platform framework 200 (e.g., the application uses direct-to-driver access), interface application or plugin 213 and orchestrator logic 214 may enable its inter-operation with platform framework 200 via API 205.

In various embodiments, orchestrator logic 208A-N, 211A-N, and 214 are each a set of APIs to manage a respective entity, such as applications 211A-N, participants 207A-N, and PF interface 213. Particularly, each entity may use its orchestrator interface to register themselves against platform framework 200, with a list of methods exposed within the orchestrator logic's APIs to query for capabilities, events to listen/respond on, and other orchestration operations tied to routing and efficiency.

In some cases, a single application may operate both as a consumer and a producer with respect to platform framework 200. For example, application 210N may operate as a consumer to receive BIOS data from BIOS 206B via API 205. In response to receiving data from producer 207B associated with BIOS 206B, application 210N may execute one of more rules to change the IHS 100's thermal settings. As such, the same application 210N may also operate as producer 206D, for example, by registering and/or advertising its thermal settings to platform framework 200 for consumption by other participants (e.g., 210A) via API 205.

Providers 209A-N are runtime objects that collect data from multiple participants and make intelligent modifications to that data for delivery to other participants (e.g., consumers) through platform framework 200. Despite a provider (e.g., 209A) being an entity within management and oversight engine 202, it may be registered and/or advertised with platform framework 200 as if it were one of producers 207A-N.

As an example, a status provider (e.g., 209A) may collect hardware information from hardware resource(s) 206A and BIOS information (e.g., from BIOS 206B), make a status determination for IHS 100 based upon that data, and deliver the status to platform framework 200 as if it were a hardware component or driver. As another example, a status provider (e.g., 209A) may receive user presence information from sensor hub 114 (e.g., hardware 206A), receive human interface device (HID) readings from OS 209C, make its user own presence determination based upon some concatenation of those two inputs, and publish its user presence determination to platform framework 200 such that other participants do not have to make redundant findings.

API 205 may include a set of commands commonly required of every participant (consumers and producers) of platform framework 200, for example, to perform get or set operations or methods. Predominantly, producers 207A-N may use API 205 to register, advertise, and provide data to consumers (e.g., 210A-N), whereas consumers 210A-N may use API 205 to receive that data and to send commands to producers 207A-N.

Moreover, applications 210A-N may discover all other participants (e.g., hardware 206A and enumerated/supported capabilities, etc.) that are registered into platform framework 200 using API 205. For example, if hardware 206A includes graphics subsystem 107, application 210A may use API 205 to obtain the firmware version, frame rate, operating temperature, integrated or external display, etc. that hardware 206A provides to platform framework 200, also via API 205.

Applications 210A-N may use information provided by platform framework 200 entirely outside of it, and/or they may make one or more determinations and configure another participant of platform framework 200. For example, application 210A may retrieve temperature information provided by hardware 206A (e.g., GPU 107), it may determine that an operating temperature is too high (i.e., above a selected threshold), and, in response, it may send a notification to BIOS 206B via producer 207B to configure the IHS's thermal settings according to a thermal policy. It should be noted that, in this example, by using API 205, application 210A does not need to have any information or knowledge about how to communicate directly with specific hardware 206A and/or BIOS component 206B.

In various implementations, API 205 may be extendable. Once a participant subscribes to, or registers with, platform framework 200 via API 205, in addition to standard commands provided by API 205 itself (e.g., get, set, discovery, notify, multicast, etc.), the registered participant may also advertise the availability of additional commands or services.

For instance, express sign-in and/or session management application 210A, thermal policy management application 210B, and privacy application 210C may each need to obtain information from one or more user presence/proximity sensors (e.g., sensors 112) participating in platform framework 200 as hardware providers 206A. In this case, the extensibility of API 205 may allow for the abstraction and arbitration of two or more sensors 112 at the platform framework 200 layer; instead of having every application 210A-C reach directly into sensors 112 and potentially crash those devices and/or driver stacks (e.g., due to contention).

As another example, raw thermal and/or power information may be provided into platform framework 200 by one or more sensors 112 as hardware producers 207A and consumed by two or more applications, such as thermal management application 210A and battery management application 210B, each of which may subscribe to that information, make one or more calculations or determinations, and send responsive commands to BIOS 206C using API 205 in the absence of any specific tools for communicate directly with hardware 206A or BIOS 206B.

As yet another example, provider 209A may communicate with an application 211A, such as a battery management application or OS service, and it may set application or OS service 211A to a particular configuration (e.g., a battery performance "slider bar") using API 205 without specific knowledge of how to communicate directly with that application or OS service, and/or without knowing what the application or OS service is; thus platform framework 200 effectively renders provider 209A application and/or OS agnostic.

Within core framework backbone 201, management and oversight engine 202 includes services 215A-N within platform framework 200 that may be leveraged for the operation of all participants. Examples of services 215A-N include, but are not limited to: registration (e.g., configured to enable a participant to register and/or advertise data with platform framework 200), notification (e.g., configured to notify any registered participant of a status change or incoming data), communication/translation between user and kernel modes (e.g., configured to allow code executing in kernel mode to traverse into user mode and vice-versa), storage (e.g., configured to enable any registered participant to store data in session storage database 204), data aggregation (e.g., configured to enable combinations of various status changes or data from the same or multiple participants), telemetry (e.g., configured to enable collection and storage of data usable for monitoring and debugging), arbitration (e.g., configured to enable selection of one among two or more data sources or requests based upon an arbitration policy), manageability (e.g., configured to manage services 215A-N and/or databases 203/204 of platform framework 200), API engine (e.g., configured to extend or restrict available commands), etc.

Framework telemetry database 203 may include, for example, an identification of participants that are registered, data produced by those participants, communication metrics, error metrics, etc. that may be used for tracking and debugging platform framework 200. Session storage database 204 may include local storage for sessions established and conducted between different participants (e.g., data storage, queues, memory allocation parameters, etc.).

In some implementations, a containerized workspace and/or an application executed therewithin may participate as a producer (e.g., 207A-N/206A-N) or as a consumer (e.g., 210A-N) of platform framework 200. Particularly, IHS 100 may be employed to instantiate, manage, and/or terminate a secure workspace that may provide the user of IHS 100 with access to protected data in an isolated software environment in which the protected data is segregated from: the OS of IHS 100, other applications executed by IHS 100, other workspaces operating on IHS 100 and, to a certain extent, the hardware of IHS 100. In some embodiments, the construction of a workspace for a particular purpose and for use in a particular context may be orchestrated remotely from the IHS 100 by a workspace orchestration service. In some embodiments, portions of the workspace orchestration may be performed locally on IHS 100.

In some embodiments, EC 120 or a remote access controller (RAC) coupled to processor(s) 101 may perform various operations in support of the delivery and deployment of workspaces to IHS 100. In certain embodiments, EC 120 may interoperate with a remote orchestration service via the described out-of-band communications pathways that are isolated from the OS that runs on IHS 100. In some embodiments, a network adapter that is distinct from the network controller utilized by the OS of IHS 100 may support out-of-band communications between EC 120 and a remote orchestration service. Via this out-of-band signaling pathway, EC 120 may receive authorization information that may be used for secure delivery and deployment of a workspace to IHS 100 and to support secure communication channels between deployed workspaces and various capabilities supported by IHS 100, while still maintaining isolation of the workspaces from the hardware and OS of IHS 100.

In some embodiments, authorization and cryptographic information received by EC 120 from a workspace orchestration service may be stored to a secured memory. In some embodiments, EC 120 may access such secured memory via an I$^2$C sideband signaling pathway. EC 120 may support execution of a trusted operating environment that supports secure operations that are used to deploy a workspace on IHS 100. In certain embodiments, EC 120 may calculate signatures that uniquely identify various hardware and software components of IHS 100. For instance, remote EC 120 may calculate hash values based on instructions and other information used to configure and operate hardware and/or software components of IHS 100.

For instance, EC 120 may calculate a hash value based on firmware and on other instructions or settings of a component of a hardware component. In some embodiments, hash values may be calculated in this manner as part of a trusted manufacturing process of IHS 100 and may be stored in the secure storage as reference signatures used to validate the integrity of these components later. In certain embodiments, a remote orchestration service supporting the deployment of workspaces to IHS 100 may verify the integrity of EC 120 in a similar manner, by calculating a signature of EC 120 and comparing it to a reference signature calculated during a trusted process for manufacture of IHS 100.

EC 120 may execute a local management agent configured to receive a workspace definition from the workspace orchestration service and instantiate a corresponding workspace. In this disclosure, "workspace definition" generally refers to a collection of attributes that describe aspects a workspace that is assembled, initialized, deployed and operated in a manner that satisfies a security target (e.g., the definition presents an attack surface that presents an acceptable level of risk) and a productivity target (e.g., the definition provides a requisite level of access to data and applications with an upper limit on latency of the workspace) in light of a security context (e.g., location, patch level, threat information, network connectivity, etc.) and a productivity context (e.g., performance characteristics of the IHS 100, network speed, workspace responsiveness and latency) in which the workspace is to be deployed. A workspace definition may enable fluidity of migration of an instantiated workspace, since the definition supports the ability for a workspace to be assembled on any IHS 100 configured for operation with the workspace orchestration service.

In specifying capabilities and constraints of a workspace, a workspace definition (e.g., in the form of an XML file, etc.) may prescribe one or more of: authentication requirements for a user, types of containment and/or isolation of the workspace (e.g., local application, sandbox, docker container, progressive web application (PWA), Virtual Desktop Infrastructure (VDI)), applications that can be executed in the defined containment of the workspace with access to one or more data sources, security components that reduce the scope of the security target presented by the productivity environment (e.g., DELL DATA GUARDIAN from DELL TECHNOLOGIES INC., anti-virus software), the data sources to be accessed and requirements for routing that data to and from the workspace containment (e.g., use of VPN, minimum encryption strength), workspace capabilities available to independently attach other resources, whether or not the workspace supports operability across distinct, distributed instances of platform framework 200 (e.g., by including or excluding an identity of another platform framework, or an identity of another workspace with access to a platform framework).

In some implementations, workspace definitions may be based at least in part on static policies or rules defined, for example, by an enterprise's Information Technology (IT) personnel. In some implementations, static rules may be combined and improved upon by machine learning (ML) and/or artificial intelligence (AI) algorithms that evaluate historical productivity and security data collected as workspaces are life cycled. In this manner, rules may be dynamically modified over time to generate improved workspace definitions. If it is determined, for instance, that a user dynamically adds a text editor every time he uses MICROSOFT VISUAL STUDIO from MICROSOFT CORPORATION, then the workspace orchestration service may autonomously add that application to the default workspace definition for that user.

During operation, as an instantiated workspace is manipulated by a user, new productivity and security context information related to the behavior or use of data may be collected by the local management agent, thus resulting in a change to the productivity or security context of the workspace. To the extent the user's behavioral analytics, device telemetry, and/or the environment has changed by a selected degree, these changes in context may serve as additional input for a reevaluation, and the result may trigger the remote orchestration service to produce a new workspace definition (e.g., adding or removing access to the workspace as a consumer or producer to an external or distributed platform framework), extinguish the current workspace, and/or migrate contents of the current workspace to a new workspace instantiated based on the new workspace definition.

In some cases, platform framework 200 may be extensible or distributed. For example, different instances or portions of platform framework 200 may be executed by different processing components (e.g., processor(s) 101 and EC 120) of IHS 100, or across different IHSs. Additionally, or alternatively, independent instances of platform framework 200 may be executed by different workspaces and in secure communications with each other, such that a participant, service, or runtime object's handle may identify the particular platform framework 200 that the participant or service is registered with. Services between these different instances of platform frameworks may communicate with each other via an Interprocess Communication (IPC) resource specified in a handle provided by the workspace orchestration service for communications with the workspace(s) involved.

In some embodiments, a workspace definition may specify the platform framework namespaces that a workspace will rely upon. Producers and providers may be associated with namespaces that are supported by a platform framework. For example, producers associated with each of the cameras that are available may be registered within a camera namespace that is supported by platform framework 200. In the same manner, producers and providers that provide user presence detection capabilities may be registered within a user presence detection namespace that is supported by platform framework 200. Other examples of namespaces may include, but are not limited to: a location namespace, a posture namespace, a network namespace, an SoC namespace, etc.

For instance, a workspace definition may specify registration of a workspace in a user presence detection namespace of the IHS, where user presence information may be utilized by the workspace in enforcing security protocols also set forth in the workspace definition, such as obfuscating the graphical interfaces of the workspace upon detecting a lack of a particular user in proximity to the IHS, thus preserving the confidentiality of sensitive data provided via the workspace.

In some cases, the workspace definition of a workspace may specify that the workspace: instantiate its own a platform framework, use a platform framework instantiated within another workspace (in the same or different IHS), and/or use a combination of different instances of platform frameworks (one or more of which may be instantiated by another workspace). Moreover, the platform framework option as prescribed by a workspace definition may be based upon the resolution of any of the aforementioned contextual rules (e.g., based on IHS posture, location, user presence, etc.).

As used herein, the term "runtime object" refers to a piece of code (e.g., a set of program instructions) or information that can be instantiated and/or executed in runtime without the need for explicit compilation. For example, in the context of an arbitration operation, the code that executes the arbitration may already be compiled, whereas the polic(ies) that the code enforces may change at runtime (e.g., by a user's command in real time) and therefore may be considered "runtime objects."

In various embodiments, systems and methods described herein may provide OS-agnostic runtime object arbitration for platform framework 200. Particularly, these systems and method may provide mechanisms for defining, registering, and/or receiving notifications of state changes identified via an arbitration runtime object, for example, based upon the application of an arbitration policy. In response to these state changes, platform framework 200 and/or a participant (e.g., 210A-N) receiving the notification may perform modifications to API 205, hibernate IHS 100 and/or suspend its operation, de-register (i.e., evict or free) other arbitration objects, etc.

Using systems and methods described herein, an arbitration object may register into platform framework 200 via API 205, receive one or more runtime objects, and perform an arbitration or selection operation based upon an arbitration policy. For example, when a location of IHS 100 matches an arbitration policy's location rule(s) (that is, when any applicable contextual rule is met), the arbitration object may select a first processor to execute a first video processing operation upon a video workload. When the IHS location changes, the arbitration object may select a second processor to continue processing a remainder of the video workload with a different video processing operation or with the same operation but different processing parameters (e.g., resolution, size, fidelity, etc.). Additionally, or alternatively, when the IHS location changes, the arbitration object may select between different processors and/or video processing operations for specific aspects (or layers) of a video input or workload, such as: virtual backgrounds, live video streams, video effects, digital watermarks, shared application windows or documents, etc. The arbitration object may then notify platform framework 200 of the arbitration result (or status change), and platform framework 200 may notify any registered participant (e.g., 210A-N) of the arbitration decision.

Other examples of runtime objects that may be arbitrated in a similar fashion include, but are not limited to: operating temperature objects (from different temperature sensors or different IHS hardware components), battery metrics objects (e.g., from an OS and a battery management unit), IHS performance objects (e.g., from an OS and an optimization application), IHS posture objects (e.g., from different posture sensors), audio capture objects (e.g., an external and an internal microphone), video capture objects (e.g., from different cameras), IHS location objects (e.g., from a wireless network interface and a GPS sensor), calendar objects (e.g., from a calendar application or plugin), etc.

In some cases, platform framework 200 may perform a first arbitration operation upon a set of runtime objects for all or most participants (e.g., 210A-N) based upon a first arbitration policy, and one or more differentiated arbitration objects may register with platform framework 200 (e.g., as applications 210A-N or providers 209A-N) to implement a second or custom arbitration operation, different from the first operation, and made available to other subscribed applications, also via platform framework 200.

To that end, API 205 may define an arbitration object including, for example: a type, a policy and/or conditions, the use of selected processor(s) 101, GPU 107, hardware accelerator, or other SoC cores to execute conditions, required runtime objects (e.g., from producers 207A-N and/or providers 209A-N), states or context of arbitration (IHS posture, application(s) under execution, IHS location, user presence/proximity, or any combination of context information described herein), etc.

API 205 may also include a notification command to convey arbitration results to subscribed applications, for example, as defined in session storage database 204. A corresponding notification service (e.g., 215A) may be configured to notify a participant in response to certain conditions being met, for example, by executing a notification policy that specifies that a notification event be triggered only in response to: N state changes (where N is greater than 1), an IHS location, an IHS posture, an IHS temperature, a performance state of IHS 100, a battery charge level, an application under execution, a user presence state or proximity, a calendar event (e.g., a video communication, a broadcast, a virtual conference, a remote meeting, start and/or end times, duration, participants, participants' roles, etc.).

Contextual actions tied to arbitration policy object state changes may include, but are not limited to: moving or migrating a video workload to/from CPU 102, moving or migrating a video workload to/from hardware accelerator(s) 125, changing a configuration or processing parameter of a portion of a video workload (e.g., lower or higher resolution processing, omit or add video processing operations, etc.), etc.

In some implementations, a first application may register with platform framework 200 as an arbitration object via API 205 using a specification (e.g., in JavaScript Object Notation or "JSON") such as:

```
{
"comments": "API spec for arbitration object",
"auth_token": "rt12342d",
"container_id": "abcd",
"platform_id": "p5435",
"conditions": [{
"comments": "could be 'simple' for CPU processing or 'complex' for
instructions to offload core',
    "type": "simple",
    "handle to policy": "void *ptr",
    "subsystem": "UPD",
    "registered object auth tokens": ["t1", "t2",....]
}, {
    "type": "complex",
    "handle to policy": "void *ptr",
    "subsystem": "DTT",
    "registered object auth tokens": ["t3", "t4",....]
}, {
    ...
}]
}
```

An arbitration policy may include, for instance, a set of one or more rules that selects between a CPU 102 and/or one or more offload processor(s) 125 to process video workloads depending upon a context of IHS 100. In the cases where complex arbitration policies are executed, the API specification of the arbitration object may also select SoC cores to run those policies (e.g., from a hardware accelerator coupled to processor(s) 101 in IHS 100), register IHS 100 state change events, move video workload(s) from IHS 100 to the cloud, to a containerized application, etc.

A second application may register with platform framework 200 to receive events from state changes as well as other runtime events determined by the first application and/or from platform framework 200, such as UPD and other context and/or telemetry changes, by execution of a registered arbitration policy. Moreover, the second application may perform contextual actions tied to those state changes. In some cases, the first and second applications may be a single application with a single plugin.

Figure 3:
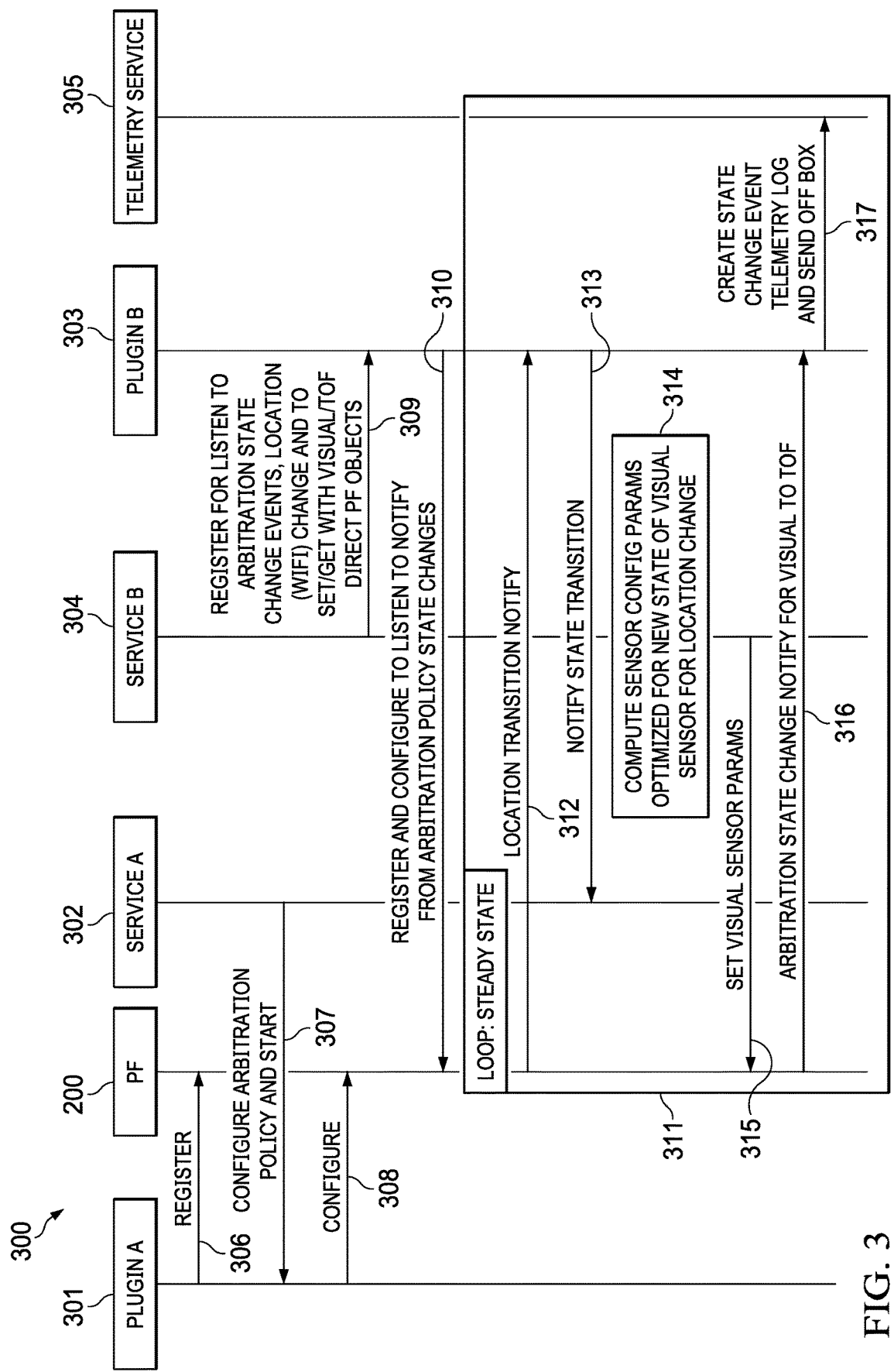
FIG. 3 is a message diagram illustrating an example of a method for platform framework arbitration, according to some embodiments.

FIG. 3 is a message diagram illustrating an example of method 300 for platform framework arbitration, according to some embodiments. In this example, method 300 determines whether to use an image sensor object to a TOF sensor object, based upon a location of IHS 100, to calculate a user's proximity to IHS 100. In other implementations, however, method 300 may be similarly used to determine whether to process a portion of a video workload with a first or second one of a plurality of available processors based upon selected contextual trigger(s), and/or whether or how to apply a watermarking, video/image mirroring, and/or eye direction correction policy, as described in more detail below.

As shown, at 306, plugin A 301 (e.g., an instance of PF interface 213) for service A 302 (e.g., an instance of PF-unaware application 212) registers with platform framework 200 as an arbitration object using a service (e.g., 215A-N) within management and oversight engine 202 via API 205. At 307, service A 302 sends plugin A 301 a message to configure an arbitration policy with an arbitration service (e.g., 215A-N) of management and oversight engine 202, and at 308, plugin A 301 configures platform framework 200 to receive selected runtime objects relevant to the policy and to execute the policy. Alternatively, service A 302 may execute the policy.

At 309, service B 304 (e.g., another instance of PF-unaware application 212) sends a command to plugin B 303 (e.g., another instance of PF interface 213) to register with platform framework 200. At 310, plugin B 303 invokes services (e.g., 215A-N) within management and oversight engine 202 of platform framework 200 via API 205 to register and configure it to be notified in response to arbitration policy results and/or context changes. In some cases, the registration command may specify a state or context variable name, an arbitration policy (among a plurality of policies), and/or an arbitration object (e.g., service A 302).

In loop 311 (steady state operation), at 312, platform framework 200 notifies plugin B 303 that the physical location of IHS 100 is transitioning and/or has changed (e.g., as determined by GPS coordinates, access point signal strength, etc.). At 313, plugin B 303 notifies service B 304 of the location transition or change.

At 314, service B 304 computes sensor configuration parameter(s) optimized for operation of a registered image sensor object at the new IHS location (e.g., indoors vs. outdoors, as characterized by ALS readings, etc.). Then, at 315, service B 304 sends a set command to platform framework 200 for implementing those computed parameters into the image sensor's hardware or software through the corresponding image sensor object, for example, by way of a service (e.g., 215A-N) within management and oversight engine 202.

At 316, platform framework 200 executes the policy as configured in 308 and notifies plugin B 303 of an arbitration state change from image sensor object to a TOF sensor object, for example, in response to an ALS sensor reading at a new IHS location being above or below a threshold value. At 317, in response to 316, plugin B 303 sends telemetry service 305 (e.g., a service 215A-N within management and oversight engine 202) a message to create a state change event in telemetry database 203 and/or to send the event to another IHS.

In some embodiments, service A 302 and service B 304 may be the same application (e.g., applications 210A-N or 213). Additionally, or alternatively, service A 302 and service B 304 may be OS services.

In some situations, an application may configure multiple runtime objects, for example, by executing unique configuration commands in serial fashion. If a new object or component is added to platform framework 200, however, the application must then get updated to set that new object. This can be particularly cumbersome in cases when, for example, IHS 100 moves into a new power or performing state and various devices need to be made aware of the change at once.

For instance, in a situation a user may have two applications running on IHS 100, one that performs user detection via low power passive vision collection and another one that performs network synchronization of data. The user may configure IHS 100 into a low performance mode via a power management application. In such a scenario, the power management application would conventionally need to have knowledge of and communicate with all registered software applications to alert them of the new performance state. Using systems and methods described herein, however, platform framework 200 may be configured to receive such an alert from a power management object registered on behalf of the power management application, and, in response, provide indications at once to all applications (e.g., 210A-N or 213) that have been registered to receive those arbitration results (e.g., that power restrictions are being made).

Figure 4:
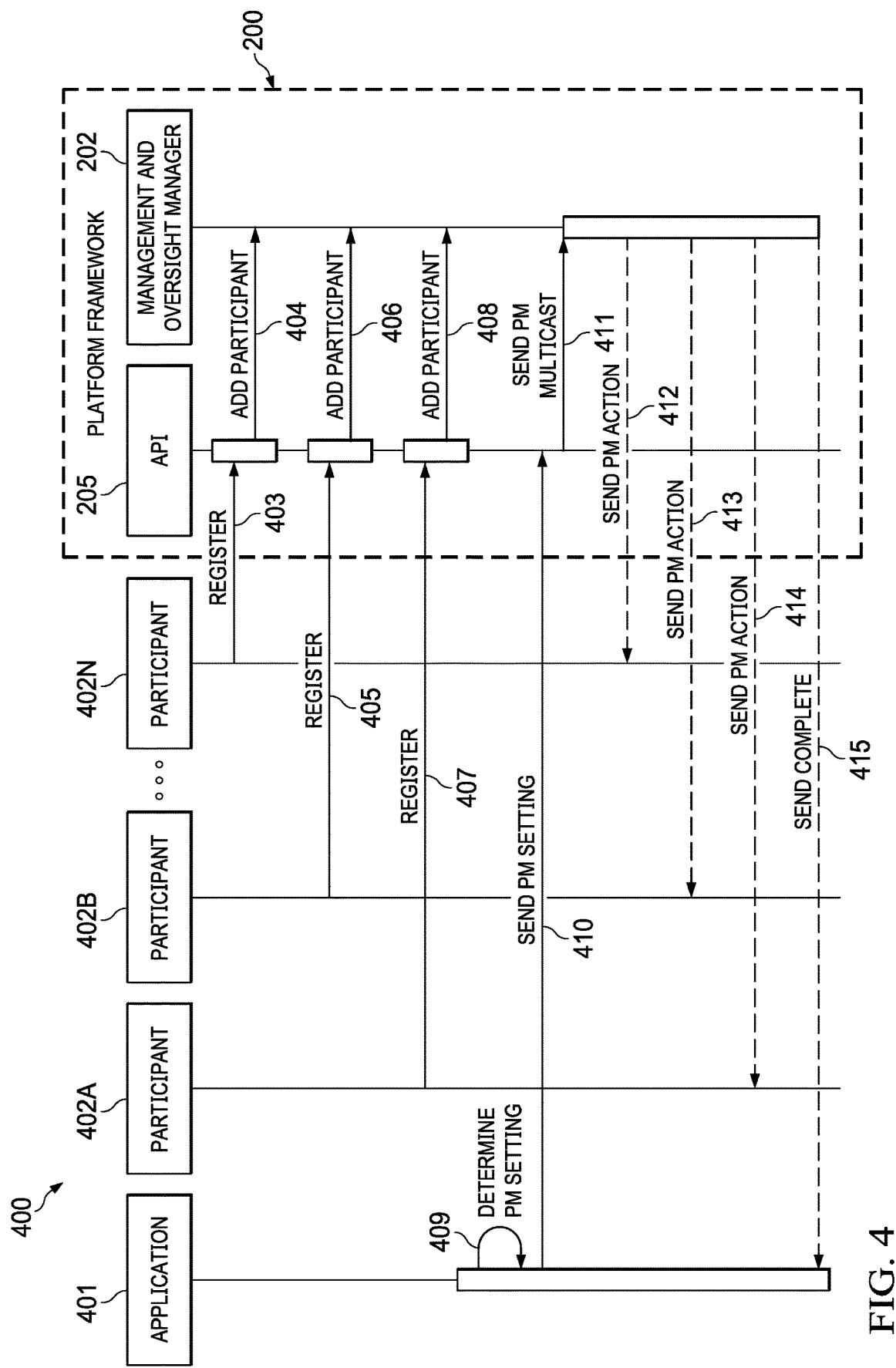
FIG. 4 is a message diagram illustrating an example of a method for platform framework multicasting, according to some embodiments.

FIG. 4 is a message diagram illustrating an example of method 400 for platform framework multicasting, according to some embodiments. In this example, method 400 multicasts a power notification resulting from the enforcement of a power management policy. In other implementations, however, method 400 may be similarly used to multicast video orchestration notifications resulting from the enforcement of an intelligent video orchestration policy, such as a watermarking, video/image mirroring, eye direction correction policy, or the like.

As shown, application 401 is registered with platform framework 200. At 403, 405, and 407, participants 402A-N (e.g., applications 210A-N) send registration commands to API 205, which cause management and oversight engine 202 to add those participants to a list of consumers of an IHS power status change indication at 404, 406, and 408, respectively.

Application 401 is registered onto platform framework 200, for example, as a provider 209A-N or producer 107A-N. As such, application 401 collects runtime objects and/or power configuration options using discovery mechanisms. Upon determination of a need to configure IHS 100 into a specific low-power mode at 409, application 401 at 410 makes a call to API 205 to use a notification service (e.g., 215A-N) of management and oversight engine 202 at 411 to send multicast messages 412-414 to all registered participants 402A-N. Lastly, the notification service (e.g., 215A-N) may send message 415 to application 401 notifying it that the multicast even has been completed, its status (e.g., failure or success with respect to a specific participant, etc.).

Large IHS manufacturers (e.g., Original Equipment Manufacturers or "OEMs") typically produce and support multiple commercial and consumer IHS models, each model having different hardware capabilities. For example, a high-end IHS may include a companion die architecture with a powerful offload processor (e.g., hardware accelerator 125), whereas a low-end IHS may have a simpler companion die architecture with a smaller offload processor. Also, an SoC's capabilities for offloading certain processing tasks from a host CPU may vary widely between low-end and high-end IHSs.

To enable the intelligent orchestration of video participants in platform framework 200, systems and methods described herein may provide the ability to: discover normative platform capabilities for SoC and companion dies; and enforce the orchestration, manageability, and/or arbitration policies suitable to control which resource (e.g., host processor 102, offload processor 125, etc.) IHS 100 should or may use to process a video workload (e.g., live video feed from a camera coupled to IHS 100) or portion thereof in a given context.

For example, in some IHSs equipped with VPUs, the VPU may be used exclusively for the offloading of AI/ML video processes. In other IHSs, however, the VPU may also be used for video playback.

In various implementations, systems and methods described herein may enable the registration and configuration (e.g., control APIs, code load for offload functionality, I/O data handle configurability, etc.) of video participants, applications, and/or consumers by platform framework 200. These systems and methods may also provide for the orchestration of video resources by enforcing certain types of arbitration policies ("intelligent video orchestration policies") that tie the use of those resources to dynamic contextual and/or configuration changes.

For example, if IHS 100 enters a secure location and in response a camera and/or companion die's VPU is disabled, video workloads currently executed on a VPU may be moved or migrated to another offload core or to the host CPU, as prescribed by an intelligent video orchestration policy. Additionally, or alternatively, in response to the context change, subsequent portions of the video workload may continue to be processed by the same processor, but with a corresponding change in configuration (e.g., lower fidelity, simpler filtering, less processing, etc.), as prescribed by the intelligent video orchestration policy.

Systems and methods described herein may also enable the dynamic de-registration of one offload core, and in response move a video workload to another offload core, as prescribed by an intelligent video orchestration policy. For example, a simpler segmentation-based virtual background replacement performed by a VPU (a first offload core) on a companion die may be appropriate for general collaborative meetings, but a more computationally-expensive algorithm involving a DNN processor (a second offload core) may be more suitable for executive-level video presentations. The type of meeting may be indicated by a calendar application or plug-in. In some cases, a video workload may be switched between two or more a VPU and a DNN (or any other suitable offload processor) without tearing down a live or ongoing communication session, as prescribed by an intelligent video orchestration policy.

Figure 5:
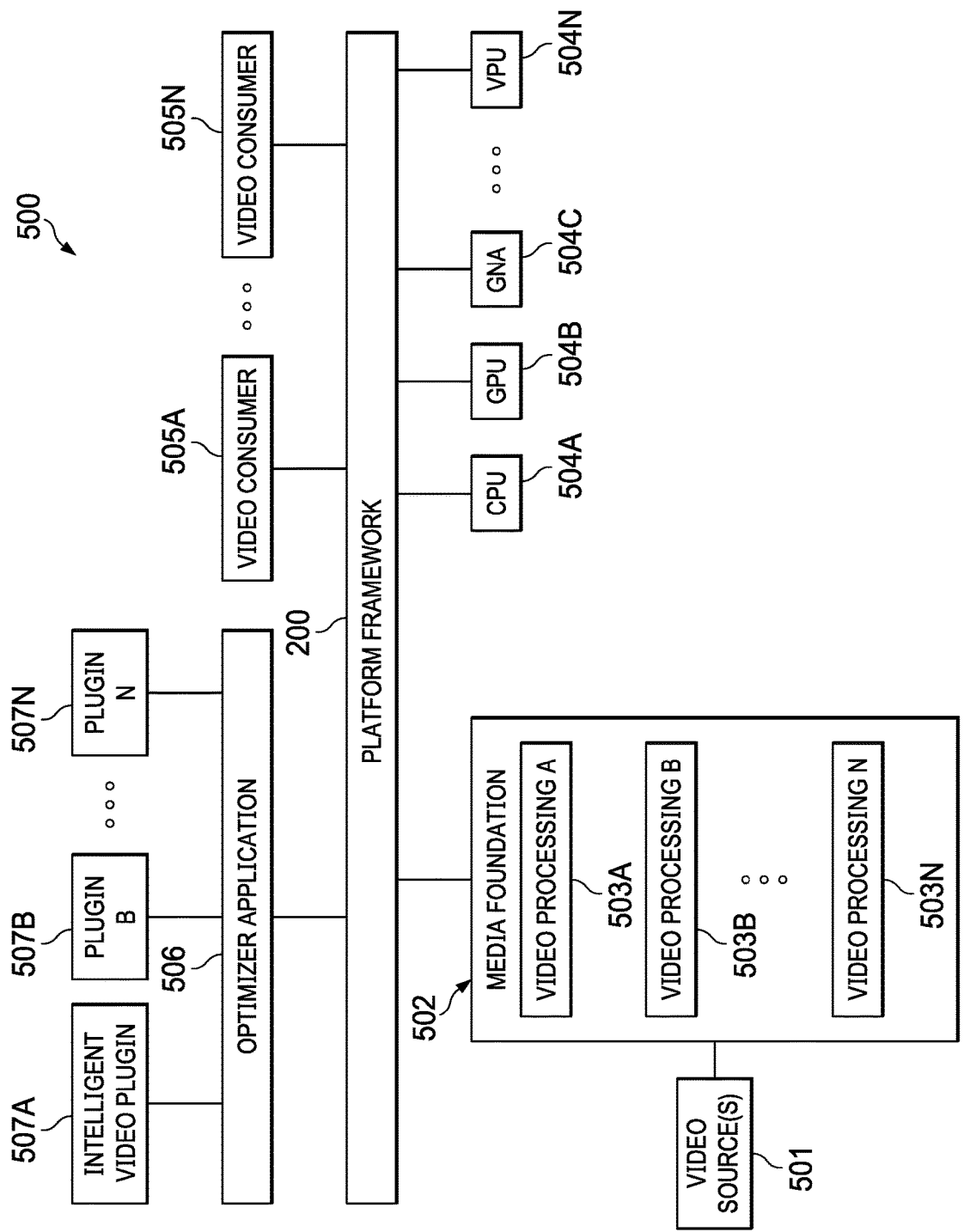
FIG. 5 is a block diagram illustrating an example of a system for intelligent orchestration of video participants in a platform framework, according to some embodiments.

FIG. 5 is a block diagram illustrating an example of system 500 for intelligent orchestration of video participants in platform framework 200, according to some embodiments. For simplicity of explanation, elements such as API 205, orchestrators 108A-N and 211A-N, etc. have been omitted. It should be understood, however, that optimizer application 506 communicates with services 215A-N of platform framework 200 via API 205, and so on, as described in FIG. 2.

As shown, video source 501 produced by camera 112 (e.g., a live video input or feed) by a communication or collaboration application (e.g., 505A) (e.g., a shared desktop, application window, or document) and/or from an OS service may provide a signal or frames to be shared during a communication or collaboration session, for example, after being processed by media foundation engine 502, which in turn may be a component of OS 206C. Particularly, media foundation engine 502 may apply any number of video processing operations 503A-N to video source 501 in any selected order and with any selected configuration parameters.

Examples of video processing operations 503A-N include, but are not limited to: user or subject/presenter framing, resolution change, zoom in/out, lighting correction, virtual background, filtering, digital watermarking, eye contact correction, video/image mirroring, etc. In some cases, media foundation engine 502 and/or each video processing operation 503A-N may have a respective agent, driver, and/or plugin (e.g., 207C) registered with platform framework 200.

CPU 504A, GPU 504B, GNA 504C, and VPU 504N are examples of hardware devices 206A registered with platform framework 200. Each of processors and/or cores 504A-N may be available to processor some aspect of video input 501. For example, each of processors and/or cores 504A-N may be configured to perform one or more of video processing operations 503A-N at the behest of media foundation engine 502 and/or video consumers 505A-N. In some cases, one or more of processors and/or cores 504A-N may be part of a different companion die architecture (re-discoverable upon boot).

Video consumers 505A-N are examples of applications 210A-N registered with platform framework 200 and may include any application that receives video input 501 and/or processed video workloads. Examples of video consumers 505A-N include, but are not limited to, video conferencing applications, remote collaboration applications (e.g., SKYPE, ZOOM, TEAM, WEBEX, etc.). In some cases, one or more of video consumers 505A-N may also be configured to perform or request their own video processing operation(s), otherwise similar to video processing operations 503A-N, using processors and/or cores 504A-N.

Optimizer application 506 is yet another instance of applications 210A-N, and it may register with platform framework 200 to perform one or more optimization operations, for example, based upon one or more policies (e.g., arbitration policies, such as an intelligent video orchestration policy), as described in FIG. 3. To that end, intelligent video plugin 507A may provide a user interface that allows a user to select one or more video features or options, and/or to select one or more policies that, upon enforcement, enable the intelligent orchestration of video participants 502, 504A-N, 505A-N, and/or 506 via platform framework 200. Other plugins 507B-N may include software modules configured to communicate with other applications (e.g., a calendar application to retrieve impending or upcoming events), Rights Management Services (RMS) (e.g., using a MICROSOFT AZURE INFORMATION PROTECTION plugin or the like), and/or other sources of context information (e.g., sensors 112) that may not themselves be directly registered with platform framework 200 via API 205.

Figure 6:
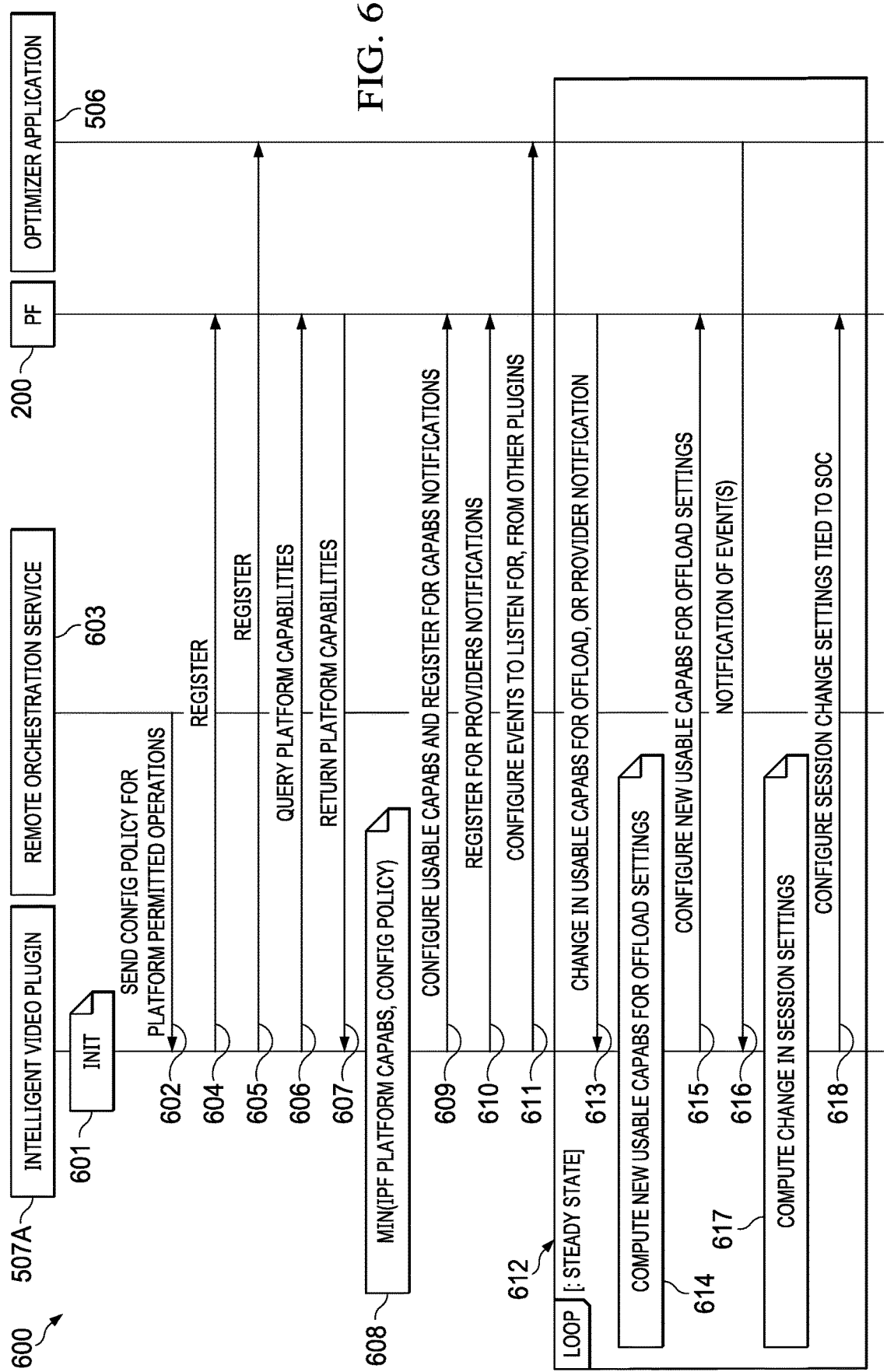
FIG. 6 is a block diagram illustrating an example of a method for intelligent orchestration of video participants in a platform framework, according to some embodiments.

FIG. 6 is a block diagram illustrating an example of method 600 for intelligent orchestration of video participants 502, 504A-N, 505A-N, and/or 506 via platform framework 200. In some embodiments, method 600 may be performed, at least in part, by optimizer application 506 and/or intelligent video plugin 507A in cooperation with platform framework 200.

At 601, intelligent video plugin 507A enters its initialization state. At 602, intelligent video plugin 507A receives from remote service 603 an intelligent video orchestration policy tying certain video processing operations and/or types of video processing operations to particular processors or types of processors (e.g., GPU, VPU, etc.) in response to a given context a change such as, for example: a change in a presence or proximity of a user, a location of IHS 100, a power state, a battery charge of the IHS, a current, upcoming, or impending calendar event, etc. In some cases, the intelligent video orchestration policy may be assigned to IHS 100 based upon a service tag, certificate, encryption key, RoT, or other suitable IHS identification.

At 604, intelligent video plugin 507A registers with platform framework 200 via API 205. At 605, intelligent video plugin 507A registers with optimizer application 506. At 606, intelligent video plugin 507A queries platform framework 200 for information about other video participants' capabilities (e.g., media foundation engine 502, CPU 504A, GPU 504B, GNA 504C, VPU 504N, video consumers 505A-N, etc.). At 607, platform framework 200 returns the queried information to intelligent video plugin 507A.

At 608, intelligent video plugin 507A matches video participants' capabilities against one or more rules in the intelligent video orchestration policy, depending upon the initial context of IHS 100. Particularly, at 608 intelligent video plugin 507A may identify, based upon the intelligent video orchestration policy, which video processing operations to offload to which cores, including data I/O, code load, etc.

At 609, intelligent video plugin 507A configures usable capabilities of selected video participants and registers to receive notifications from those participants, for example, indicating a change in core configuration, core status (such as cores running out cycles), core de-registration, etc. via platform framework 200. At 610, intelligent video plugin 507A registers with platform framework 200 for provider (e.g., 209A-N) notifications (e.g., with arbitration of results or combination data from multiple sensors, camera disablement, etc.). Then, at 611, intelligent video plugin 507A configures contextual events for optimizer application 506 to listen for (e.g., from other plugins 507B-N) contextual changes such as changes in a presence or proximity of a user, a location of IHS 100, a power state, a battery charge of the IHS, a current or impending calendar event, etc.

During loop or steady state operation 612, at 613, platform framework 200 notifies intelligent video plugin 507A of any present changes in the usable capabilities for offloading video workloads to participants 504A-N, for example. For instance, platform framework 200 may notify intelligent video plugin 507A that VPU 504N on the companion die is getting shut off due to the camera entering a privacy mode (e.g., as IHS 100 enters or leaves a secure location) or that VPU 504N is getting shut off due to the camera leaving the privacy mode (e.g., as IHS 100 enters or leaves the secure location).

At 614, intelligent video plugin 507A computes new usable capabilities for offload settings based on the intelligent video orchestration policy, taking change 613 into account. In response, intelligent video plugin 507A configures new usable capabilities for offload settings to platform framework 200 at 615. For example, intelligent video plugin 507A may move a video workload or a portion thereof from VPU 504N to CPU 102 or vice-versa. Additionally, or alternatively, intelligent video plugin 507A may change a processing parameter (e.g., pixel resolution, frame rate, etc.) of a portion of the workload.

At 616, optimizer application 506 notifies intelligent video plugin 507A of a contextual change(s) to IHS 100. In response, at 617, intelligent video plugin 507A computes a change in session settings, and at 618 intelligent video plugin 507A sends a message to platform framework 200 to configure the remainder of the session and/or to change settings tied to the companion die accordingly.

As an example, at 616, optimizer application 506 notifies intelligent video plugin 507A, using a calendar/agenda plugin (e.g., 507B) and/or via an API directly with video consumers 505A-N, that a change of presenter during a collaboration session is about to take place (e.g., an executive is going to give a speech, or has just finished giving the speech). Additionally, or alternatively, optimizer application 506 may notify intelligent video plugin 507A, using a power management plugin (e.g., 507C) that a low Relative State-Of-Charge (RSOC) notification (e.g., remaining battery level at X %) has been received, thus triggering a reduction in power consumption of IHS 100. In response, at 618, platform framework 200 may increase or reduce the complexity of the video workload (e.g., pixel resolution, frame rate, number or order of video processing operations, etc.). As another example, a change of location may require a different virtual background and/or matting to segmentation switch in one of a plurality of offload cores.

Accordingly, systems and methods described herein may provide for adaptive platform orchestration across IHS lines of varying capabilities for intelligent collaboration. Moreover, these systems and methods may adaptively scale platform compute based on SoC and application and/or contextual events.

In modern work environments, and particularly since the COVID-19 pandemic, more workers than ever have been performing their jobs remotely using communication or collaboration applications (e.g., SKYPE, ZOOM, TEAM, WEBEX, etc.) to conduct their day-to-day business. As a consequence, these remote workers are now sharing an ever-increasing number of electronic documents, spreadsheets, and presentations in internal and external meetings—some of which may include sensitive, secret, copyrighted, privileged, and/or confidential information.

In some embodiments, systems and methods described herein may increase the security and protection of sensitive, secret, copyrighted, privileged, and/or confidential content which, during a communication or collaboration session (e.g., a live or recorded presentation), may otherwise be subject to screenshots or other forms of unauthorized copying by participants of the session. For example, systems and methods described herein may use platform framework 200 to leverage RMS and data classification tools to label electronic documents in order to protect material classified for internal use, restricted, or highly restricted when such material is shared in a communication or collaboration session.

Moreover, these systems and methods may intelligently apply and/or remove digital watermarking to selected portions of content shared or broadcast in a communication or collaboration session (e.g., shared video, document, application window, desktop, etc.) via platform framework 200 based upon the enforcement of a watermarking policy using context information (e.g., document classification, IHS location, etc.). In other embodiments, systems and methods may intelligently apply and/or remove digital watermarking to selected portions of content processed by other types of applications, such as an image capture application, or any other application executed outside of a collaboration environment.

In some cases, a digital watermark may include a company logo, a copyright statement, and/or any other visual element indicative of property or ownership (e.g., intellectual property, secret, etc.). Additionally, or alternatively, participants' names, email addresses, usernames, phone numbers, etc. may be included in the digital watermark to identify persons taking part in the communication or collaboration session. As used herein, the term "digital watermark" refers to a visual marker embedded in a noise-tolerant signal or content such as audio, video, or image data and usable to identify ownership or the copyright of such content.

Figure 7:
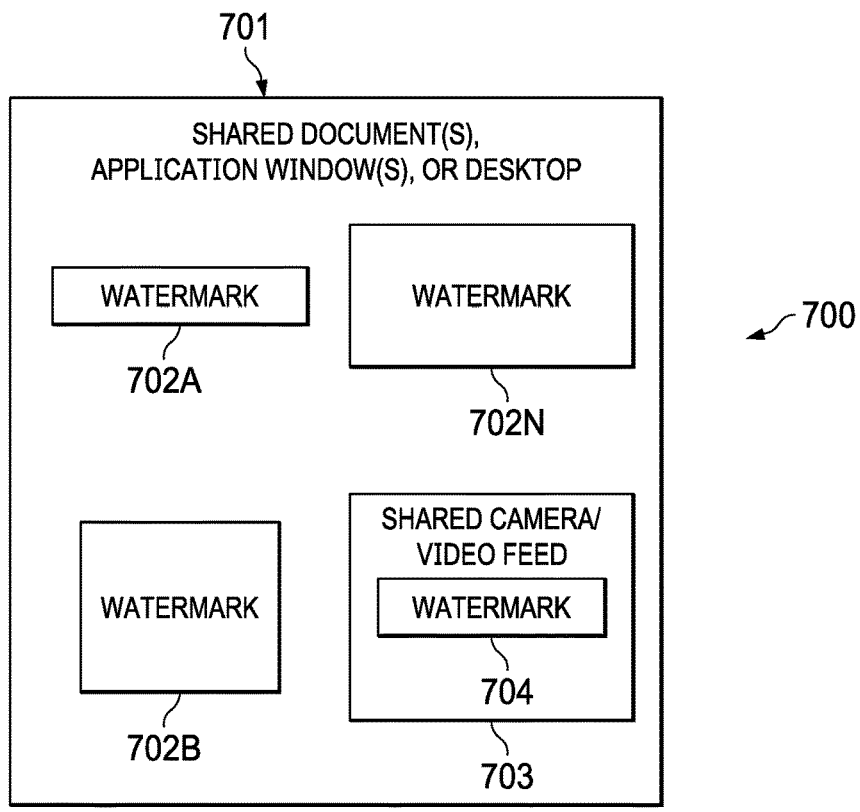
FIG. 7 is a block diagram illustrating an example screenshot of watermarks introduced into a communication or collaboration session by a watermarking service using intelligent orchestration of video participants in a platform framework, according to some embodiments.

FIG. 7 is a block diagram illustrating an example screenshot 700 of watermarks introduced into a communication or collaboration session by a watermarking service using intelligent orchestration of video participants 502, 504A-N, 505A-N, and/or 506 via platform framework 200. For example, optimizer application 506 and/or intelligent video plugin 507A may include a watermarking service configured to interface with a calendar plugin (e.g., 505B) and/or an RMS plugin (e.g., MICROSOFT AZURE INFORMATION PROTECTION or 505C) to enforce a watermarking policy based, at least in part, upon context information.

As shown, screenshot 700 represents a communication or collaboration application (e.g., 505A) window during a communication or collaboration session between two or more participants. In screenshot 700, the application window comprises shared document, application window, or desktop portion 701 and shared camera and/or video feed portion 703. Any of digital watermarks 702A-N may be applied to shared document, application window, or desktop portion 701. Additionally, or alternatively, digital watermark 704 may be applied to video feed portion 703.

To apply a digital watermark, optimizer application 506 and/or intelligent video plugin 507A may request, via platform framework 200, that media foundation engine 502 execute a corresponding one of video processing operations 503A-503N to add a video layer or image overlay upon one or more frames of video source 501 (e.g., from camera 112, from a communication or collaboration application, from the OS, etc.) containing the digital watermark using one or more of processors 504A-N as prescribed by the watermarking policy. The watermarked output of media foundation engine 502 is sent to a communication or collaboration application 505A prior to being shared or broadcast during a session.

In some cases, certain characteristics of digital watermarks 702A-N and/or 704 may be prescribed by the watermarking policy and may vary based upon context information (e.g., classification of the content, an originator of the content, a type of the communication session, a participant of the communication session, IHS location, etc.). Examples of characteristics may include but are not limited to: details of the digital watermark (e.g., one or more names of participants of the communication session retrieved from a calendaring or agenda application or plugin, reference to a non-disclosure agreement (NDA) or other governing legal document retrieved from an email or document management application or plugin, etc.), size of the digital watermark, position of the digital watermark, and number of digital watermarks.

Although screenshot 700 shows a specific configuration of shared content, it should be noted that variations are within the scope of this disclosure. For example, in some cases, shared document, application window, or desktop portion 701 may be absent. In other cases, shared camera and/or video feed portion 703 may be absent. Additionally, or alternatively, any number of shared document, application window, or desktop portions 701 or shared camera and/or video feed portions 703 may be displayed. Additionally, or alternatively, the position and relative size of any given portion of screenshot 700 may be configurable.

Figure 8:
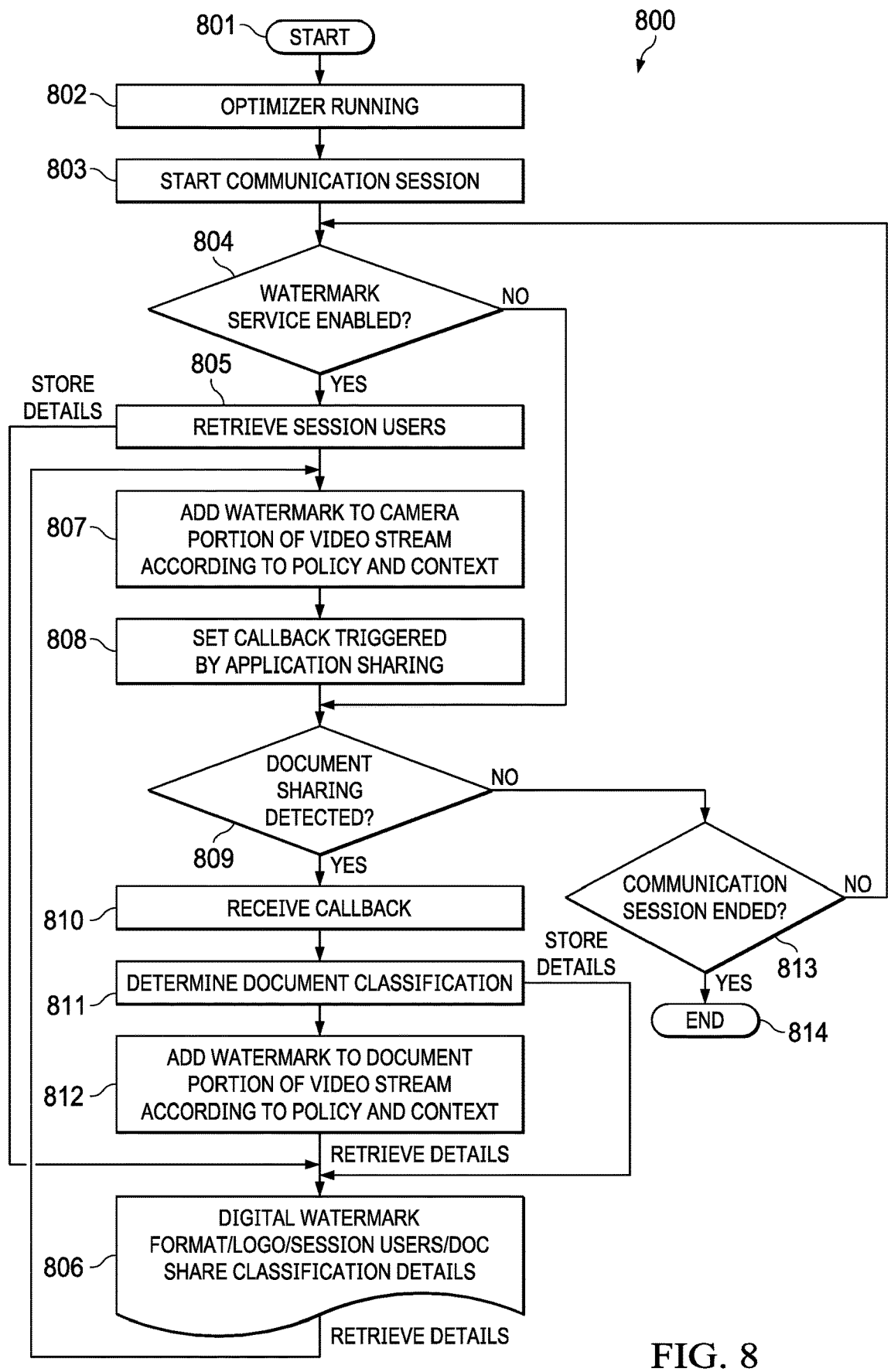
FIG. 8 is a block diagram illustrating an example of a watermarking method executed by a watermarking service using intelligent orchestration of video participants in a platform framework, according to some embodiments.

FIG. 8 is a block diagram illustrating an example of watermarking method 800 executed by a watermarking service using intelligent orchestration of video participants 502, 504A-N, 505A-N, and/or 506 via platform framework 200. In some embodiments, method 800 may be performed, at least in part, by optimizer application 506 and/or intelligent video plugin 507A (a "watermarking service") in cooperation with platform framework 200.

Method 800 starts at 801. At 802, optimizer application 506 is initiated. At 803, a communication or collaboration session is established between two or more users, for example, by one of video consumer or application 505A. At 804, optimizer application 506 determines whether a watermarking service provided by intelligent video plugin 507A is enabled. If not, 809 determines whether a document is being shared. If not, 813 determines whether the communication or collaboration session has ended. If so, method 800 ends at 814.

At 804, if the watermarking service is enabled, control passes to 805, where method 800 retrieves session users (e.g., names of people participating in the communication or collaboration session) using an API supported by video consumer or application 505A (e.g., a ZOOM API). Additionally, or alternatively, session users may be identified using a calendar or agenda application plugin 507B or RMS plugin 507C. Additionally, or alternatively, reference to an NDA or other legal document governing the ownership and/or dissemination of information may be identified using an email application plugin or document management application plugin.

The aforementioned information, as well as a logo(s), graphics, company name(s), document classification, size, format, and position of a digital watermark may be stored in session storage database 204 at 806. At 807, method 800 retrieves the information from session storage database 204 and use that information to generate and add watermark 704 to video stream 704 before it is shared during the communication or collaboration session. Particularly, at 807, method 800 may identify a watermarking policy and use that policy to determine whether to apply a digital watermark to a portion of a video workload based upon context information such as: an originator of the video, a subject of the video, a type of the communication session, or a participant of the communication session.

Still at 807, method 800 may generate and apply digital watermark 704 to video content 703, the digital watermark having characteristics (details of the digital watermark, size of the digital watermark, position of the digital watermark, number of digital watermarks, etc.) selected based upon the application of additional context information collected via sensors 112 to the watermarking policy. The additional context information may include one or more of: a user's presence or proximity state, a facial expression of the user, a direction and focus of the user's gaze, a user's hand gesture, a user's voice, an IHS location, IHS movement, lid state, hinge angle, IHS posture, whether the IHS is coupled to a dock or docking station, a distance between the user and at least one of: the IHS, the keyboard, or a display coupled to the IHS, a type of keyboard being used, whether the user operating the keyboard is typing with one or two hands, a time of day, software application(s) under execution in focus for receiving keyboard input, whether IHS 100 is inside or outside of a carrying bag or case, a level of ambient lighting, a battery charge level, whether IHS 100 is operating from battery power or is plugged into an AC power source, a power mode or rate of power consumption of various components of IHS, etc.

At 808, method 800 may set a callback with video consumer or application 505A to be notified of an application, window, or desktop sharing event using an API supported by video consumer or application 505A (e.g., a ZOOM API). At 809, if the event callback is received, control passes to 810.

At 811, method 800 determines a document, application, or desktop classification (e.g., privacy or sensitivity level, for example, based on an RMS query or the like). At 806, method 800 stores the document classification information in session storage database 204. Then, at 812, method 800 may determine whether to apply a digital watermark 702A-N to a portion of shared document, application, or desktop 701 based upon context information such as: an originator of the document, application, or desktop, a type of the communication session, or a participant of the communication session.

Method 800 generates and applies additional digital watermark(s) 702A-N to document, application window, or desktop portion 701, the digital watermark having characteristics (details of the digital watermark, size of the digital watermark, position of the digital watermark, number of digital watermarks, etc.) selected based upon the application of additional context information collected via sensors 112 to the watermarking policy. The additional context information may include one or more of: including one or more of: a user's presence or proximity state, a facial expression of the user, a direction and focus of the user's gaze, a user's hand gesture, a user's voice, an IHS location, IHS movement, lid state, hinge angle, IHS posture, whether the IHS is coupled to a dock or docking station, a distance between the user and at least one of: the IHS, the keyboard, or a display coupled to the IHS, a type of keyboard being used, whether the user operating the keyboard is typing with one or two hands, a time of day, software application(s) under execution in focus for receiving keyboard input, whether IHS 100 is inside or outside of a carrying bag or case, a level of ambient lighting, a battery charge level, whether IHS 100 is operating from battery power or is plugged into an AC power source, a power mode or rate of power consumption of various components of IHS, etc.

Accordingly, systems and methods described herein may provide a service that intelligently adds digital watermarks to both the webcam stream as well as any shared documents using an RMS classification system to protect sensitive materials during communication or collaboration sessions.

In communication or collaboration sessions that employ video, a video feed or broadcast often includes a plurality of components or layers. For example, a given video feed may include a live camera feed, a virtual background layer, a document, an overlayed text or image, an application window, a shared desktop, etc. These various components or layers may be combined into a single video stream by a broadcasting IHS and transmitted to other IHSs participating in the communication or collaboration session.

When different video components or layers are combined, however, sometimes one or more of them may be inadvertently flipped with respect to other ones, as evidenced in later-watched recordings of the communication or collaboration session. For example, sometimes a virtual background with text in it may need to be flipped in the left-to-right (L-R) orientation (or "mirroring"). Whether the virtual background is an image or video sequence, the user may not always be able to simply flip the image L-R and store it, for instance, if same image is used across multiple communication or collaboration applications where the same adjustment does not solve the inadvertent mirroring problem. Moreover, the user may desire to have the correct playback L-R orientation shown when playing back a communication or collaboration session recording.

As another example, a communication or collaboration application may have a "mirror my video" (L-R orientation) option that, when selected by a user, allows the user to preview their video correctly prior to sharing it over a communication or collaboration session. In the preview, virtual backgrounds with text are reversed. If the user responds by manually flipping and storing them in reverse orientations during the preview, these elements will appear reversed during the live communication or collaboration session.

To address these, and other concerns, systems and methods described herein may resolve and/or arbitrate inconsistencies between IHSs and IHS configurations (e.g., front-facing camera vs. back-facing camera; video/camera shows a mirrored image to user when recording, but only stores video with flipped orientation for playback; different settings and options for capturing or recording images as mirrored or unmirrored; etc.) that would otherwise make it difficult to orchestrate the proper orientation or mirroring of video components or layers shared during a communication or collaboration session.

In some embodiments, the decision of whether to flip a given video component or layer (e.g., a live camera feed, a virtual background layer, a document, an overlayed text or image, an application window, a shared desktop, etc.) may be made by optimizer application 506 and/or intelligent video plugin 507A based on a video/image mirroring policy enforced, at least in part, via platform framework 200. The video/image mirroring policy may include one or more rules for deciding whether to change the orientation of a given component or layer of a video stream to be shared or broadcast based on contextual information (e.g., IHS location, IHS posture, user proximity, etc.).

As used herein, the term "orientation" refers to a Left-to-Right (L-R), Right-to-Left (R-L), Top-to-Bottom (T-B), and/or Bottom-to-Top (B-T) orientation with respect to a center horizontal or vertical axis. To change the orientation of a video component or layer, an image transform (e.g., video processing operation 503A) may be applied to one or more frames of the video component or layer so as to flip the orientation of pixels in those frames around its horizontal or vertical center axis, depending upon context, as prescribed by a video/image mirroring policy.

In some cases, the image transform may be applied by media foundation engine 502 executed by a selected one or more of processor(s) 501A-N. Additionally, or alternatively, the image transform may be applied by one or more video consumer(s) 502A-N (e.g., a communication or collaboration application).

Figure 9A:
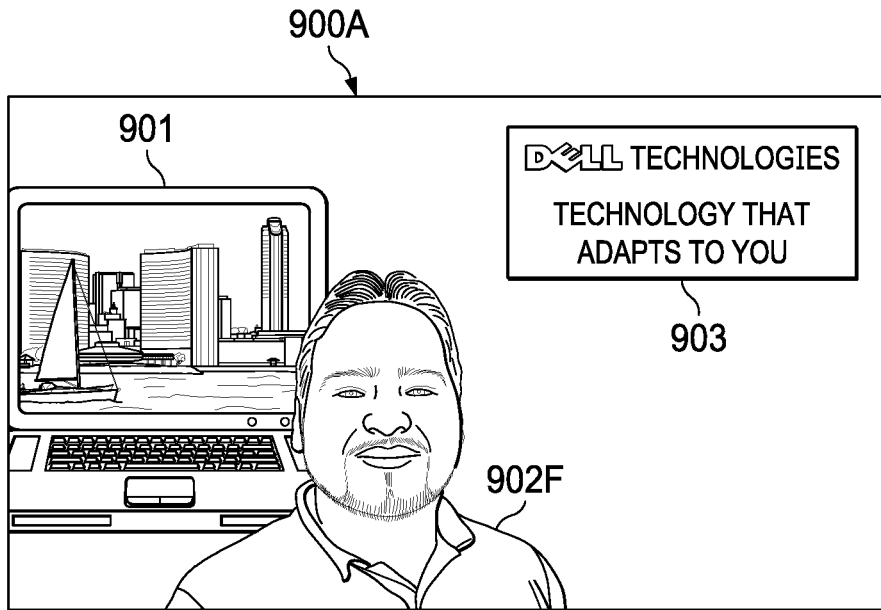
FIGS. 9A and 9B are screenshots of examples of shared content subject to video or image mirroring, according to some embodiments.
Figure 9B:
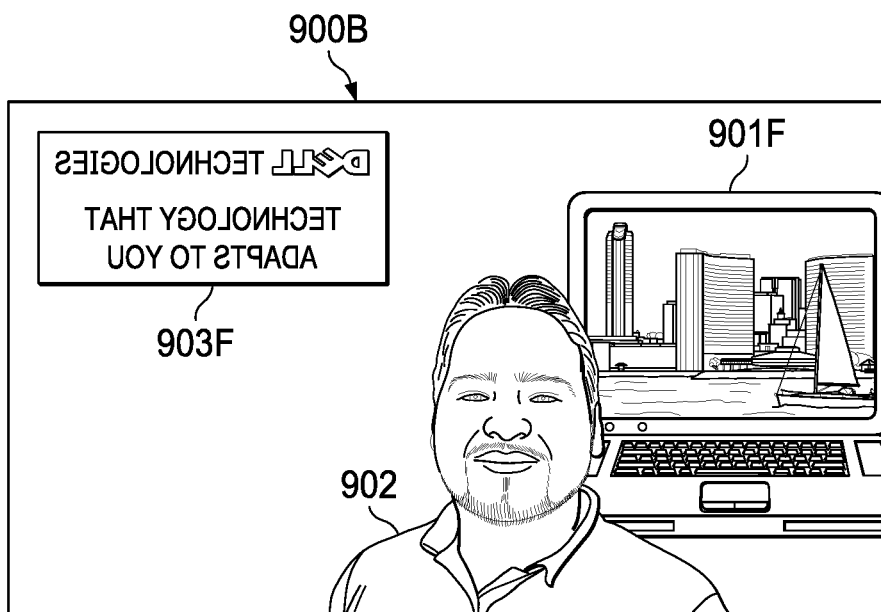

FIGS. 9A and 9B are screenshots 900A and 900B of examples of shared content subject to video/image mirroring, according to some embodiments. Particularly, in screenshot 900A, video capture portion or layer 902F is L-R flipped, virtual background portion or layer 901 is not flipped, and watermark portion or layer 903 is also not flipped. In screenshot 900B, video capture portion or layer 902 is correct, but virtual background portion or layer 901F is L-R flipped, and watermark portion or layer 903F is also L-R flipped.

To correct the orientation of any given content portion or layer 901F, 902F, and/or 903F, a video and/or image mirroring service may apply an image transform to flip that portion or layer around a horizontal or vertical center axis, based upon context (e.g., classification of content, identity or role of an originator of content, type of the communication session, identification or proximity of a participant of the communication session, IHS location, IHS posture, whether a camera source is front-facing or rear-facing with respect to the IHS, identification of a communication or collaboration application configured to establish the communication session, etc.). In some cases, a video/image mirroring policy may require that a given image or layer such as, for example, virtual background portion or layer 901F and/or watermarking layer 903F, be flipped prior to being combined into a video stream.

Figure 10:
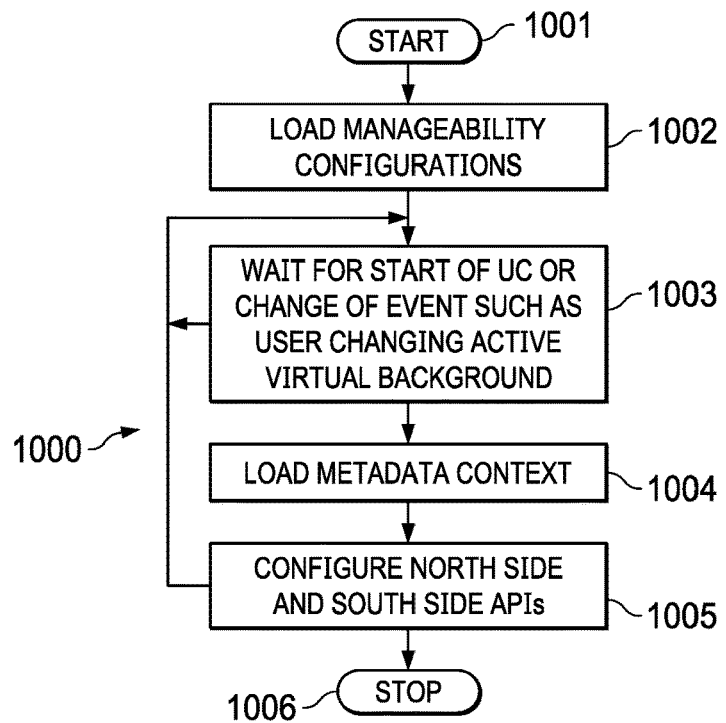
FIG. 10 is a flowchart illustrating an example of a method for intelligent orchestration of video or image mirroring using a platform framework, according to some embodiments.

FIG. 10 is a flowchart illustrating an example of method 1000 for intelligent orchestration of video/image mirroring using platform framework 200. In some embodiments, method 1000 may be performed, at least in part, by optimizer application 506 and/or intelligent video plugin 507A (a "video/image mirroring service") in cooperation with platform framework 200.

Method 1000 begins at 1001. At 1002, method 1000 loads manageability configurations including, for example, a video/image mirroring policy. In some cases, a video/image mirroring policy may have a format such as: {"UC":"zoom", "virt_bg":"LR flip", "video capture":"no flip", "recorded playback":"LR flip"} (a JSON example).

At 1003, a service (e.g., 215A-N) may watch for the initiation of communication or collaboration process by any registered video consumer (e.g., 505A-N) and/or a change of event such as user changing an active virtual background, changing an IHS posture, switching between a front-facing and a rear-facing camera, etc. Upon detection, the service (e.g., 215A-N) may notify the video/image mirroring service to load and enforce the video/image mirroring policy at 1004.

At 1005, the video/image mirroring policy may indicate to the video/image mirroring service how to configure each of video consumers (e.g., 505A-N) to account for any orchestrated change in context and/or orientation using north side APIs. Moreover, the video/image mirroring policy may indicate to the video/image mirroring service how to configure processors 504A-N and/or media foundation engine 502 via south side APIs. For example, control level APIs may include IPU6 based L-R video camera input flip (MIPI), virtual background flip, playback flip/normal, etc. Method 1000 ends at 1006.

In various implementations, the video/image mirroring policy may include one or more rules. When context information matches the requirements prescribed by a given rule, that rule is triggered or met, thus effecting (or foregoing) a change in orientation of at least a portion of the content.

For example, when a virtual background L-R flip is effected on the south side (e.g., by media foundation engine 502), video consumer 505A may be instructed to have its virtual background disabled since it has already been multiplexed into the capture stream. In some cases, video/image mirroring policies may be combined and/or stored together with other policies (e.g., a watermarking policy, an eye direction correction policy, etc.) tied to the overall manageability of intelligent communication or collaboration sessions.

In some implementations, a video/image mirroring policy may be specific to an IHS 100's stock-keeping unit (SKU). The policy's video capture and recording/playback orientation rules may be individually configured for each different video consumer application 505A-N. Additionally, or alternatively, a user may be prompted intelligent video plugin 507 to select L-R configurations for virtual backgrounds or other content as they start one of video consumer application 505A-N.

Accordingly, systems and methods described herein may adaptively set video/image mirroring with captured video, virtual background, recording state, etc. for intelligent collaboration user experience. Moreover, these systems and methods may enable the contextual rotation of virtual background or other content based on IHS postures, content of video stream, etc.

In many situations, whether in a video conference or recorded video session, a user often finds themselves interacting directly with a front-facing video camera mounted on their IHS's primary display—e.g., looking straight at the display's built-in or attached camera—while occasionally and/or periodically looking at content on and off the primary display, for instance, on a secondary display. During a typical communication or collaboration session, a user's gaze may continually change, at times looking directly at a camera, and at other times looking away from that camera and towards content. For example, content may be located on (a lower portion of) the primary display, on a secondary display, on another IHS, on a whiteboard, etc., or it may be a physical object, exhibit, sample, etc.

To viewers or other participants of the video conference, a presenter's frequent change of gaze with respect to the front-facing video camera can have a distracting effect (similar to when a newscaster is looking at the wrong camera during a news broadcast on television). To address this, systems and methods described herein may employ two or more cameras to maintain user eye contact during a communication or collaboration session as a user's gaze changes direction, for example, by automatically switching between video feeds produced by the two cameras based upon an evaluation of a weighted average gaze vector.

In some cases, the weighted gaze vector may be based upon a combination of gaze vectors calculated using images from each camera. The gaze vector (g) processed from each camera may be multiplied by a respective contextual factor or weight (a) selected based upon at least one of: a direction of a sound detected with two or more microphones, an angle of arrival or an angle of departure of a wireless device (e.g., using BLUETOOTH 5.1), a proximity of a presenter to a given camera (e.g., the closest to a given camera the user is, the greater the weight assigned to a gaze vector from that camera and/or the farther from a given camera the user is, the smaller the weight assigned to a gaze vector from that camera), a specification of a given one of the plurality of cameras (e.g., the greater the resolution of a given camera, the greater the weight assigned to a gaze vector from that camera and/or the smaller the resolution a given camera, the smaller the weight assigned to a gaze vector from that camera), a user preference or setting, etc.

An example of user preference or setting may include a user's preference for a primary camera over a secondary camera that increases an amount of time the primary camera is used (e.g., over the secondary camera) to share its video feed during a communication or collaboration session. Additionally, or alternatively, the user preference or setting may apply a hysteresis setting that increases an amount of time required before which a change of direction of the weighted gaze vector, maintained at a value greater than a selected threshold value, triggers a corresponding change of camera and/or video feed during a communication or collaboration session.

In some implementations, to apply the eye contact correction operation, IHS 100 may determine whether and/or how to enforce an eye contact correction policy via platform framework 200 based, at least in part, upon context information. Such context information may include, for example: a classification of the video being shared (or other content subject to the user's gaze), an identity or role of an originator of the video or content, a type of the communication session, an identification of an application configured to establish the communication session (and/or to provide the other content subject to the user's gaze), an IHS location, an IHS posture, etc.

The decision of whether and/or when to switch a video input between two or more camera sources may be made by optimizer application 506 and/or intelligent video plugin 507A based on the eye contact correction policy (e.g., an arbitration policy) via platform framework 200. An eye contact correction policy may include one or more rules for deciding whether to change the source of a video stream to be shared or broadcast based on contextual information. Additionally, or alternatively, an eye contact correction policy may include one or more rules for deciding whether and/or how to apply a user framing operation (e.g., video processing operation 503A of media foundation engine 502).

Figure 11:
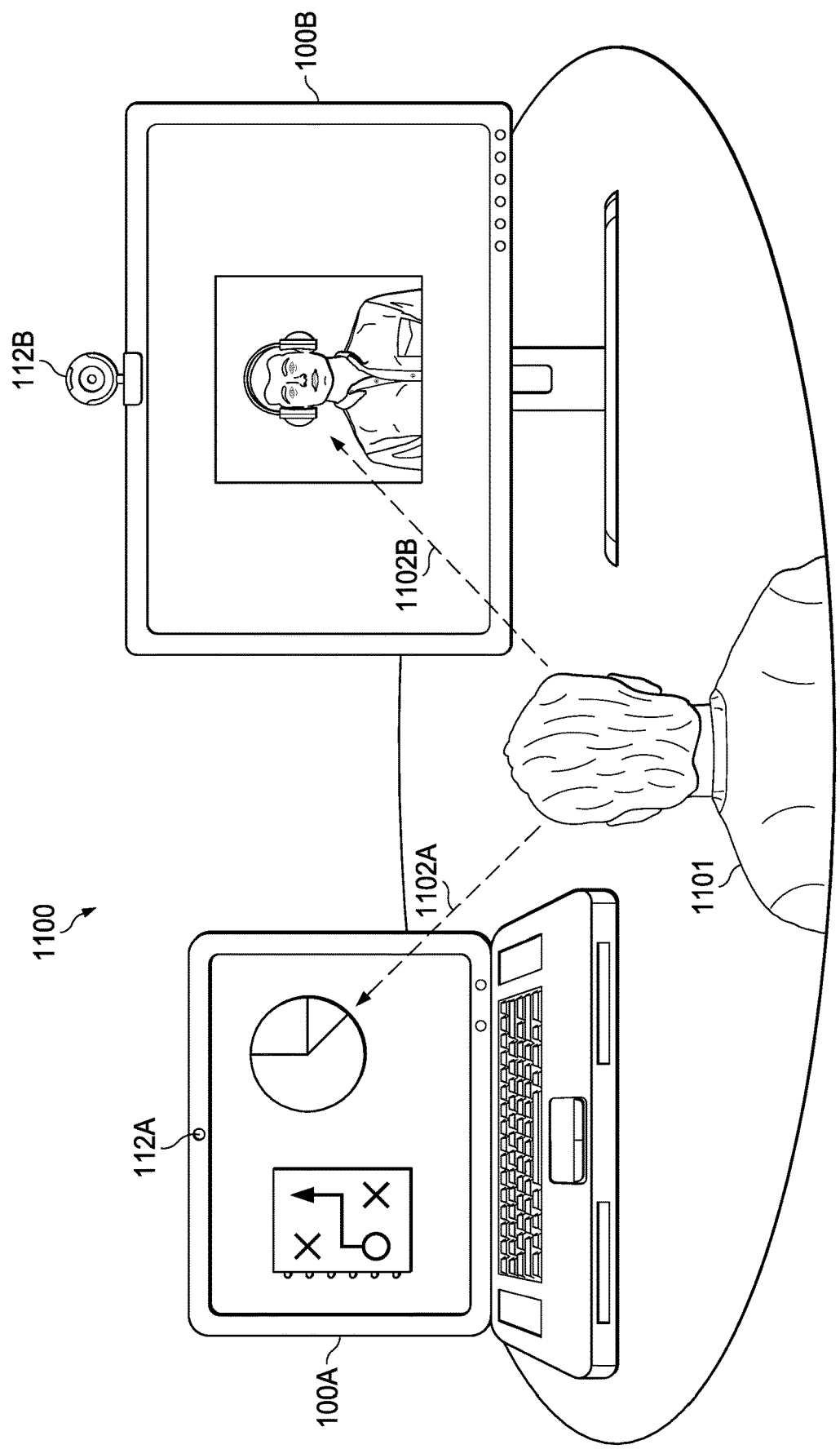
FIG. 11 is a diagram of an example of a system for eye contact correction in a communication or collaboration session using a platform framework, according to some embodiments.

FIG. 11 is a diagram of an example of system 1100 for eye contact correction in a communication or collaboration session using platform framework 200. As shown, user 1101 operates IHS 100A coupled to secondary display or IHS 100B. In this configuration, IHS 100B displays a video feed of another user participating in the communication or collaboration session, whereas IHS 100A displays other content (e.g., documents, presentations, materials shared during the session, etc.). IHS 100A includes front-facing camera 112A and webcam 112B is mounted on IHS/display 100B.

In some cases, both front-facing camera 112A and webcam 112B may be coupled to IHS 100A and registered with platform network 200. In other cases, webcam 112 may be coupled to IHS 100B and registered with a platform network 200 distributed between IHSs 100A and 100B. Although system 1100 shows two IHSs 100A and 100B, each having a respective display, and two cameras 112A and 112B, it should be understood that systems and methods described herein are scalable to any number of IHSs (one or more), cameras (two or more), or displays (if any).

In system 1100, when user 1101 is looking toward IHS 100A, as determined by a weighted average of gaze vector(s) 1102A and 1102B, the video feed from front-facing camera 112A may be shared over the communication or collaboration session. Conversely, when user 1101 is looking toward IHS 100B, as determined by a weighted average of gaze vector(s) 1102A and 1102B, the video feed from webcam 112B may be shared over the communication or collaboration session. To make these determinations, the weighted average gaze vector may be calculated using gaze vector(s) 1102A and/or 1102B as well as any of the aforementioned contextual information as individual weights associated with each video source or camera. Moreover, the weighted average gaze vector may also be used to perform a user framing operation or the like.

Figure 12:
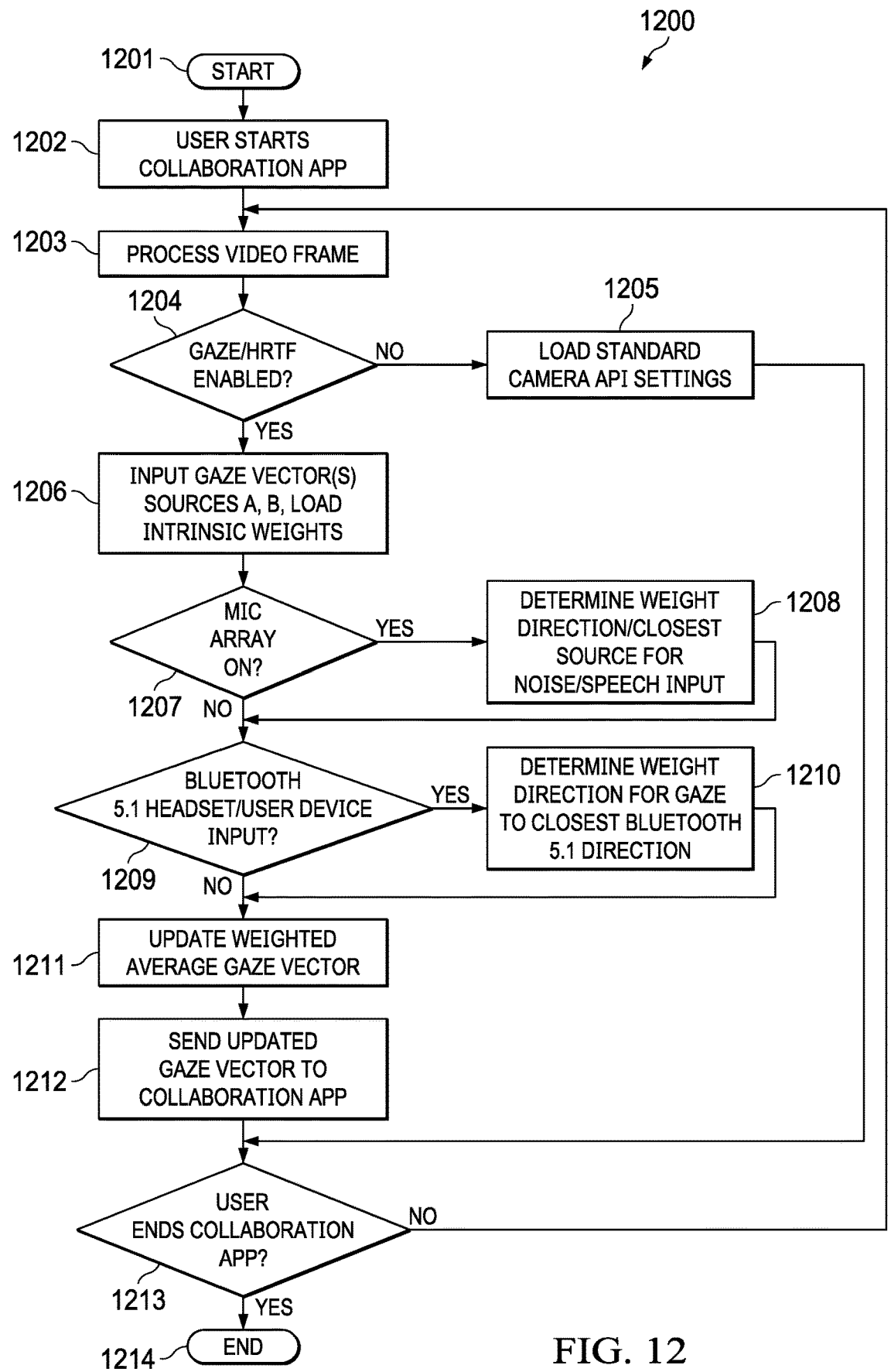
FIG. 12 is a flowchart of an example of a method for eye contact correction in a communication or collaboration session using a platform framework, according to some embodiments.

FIG. 12 is a flowchart of an example of method 1200 for eye contact correction in a communication or collaboration session using platform framework 200. In some embodiments, method 1200 may be performed, at least in part, by optimizer application 506 and/or intelligent video plugin 507A (an "eye contact correction service") in cooperation with platform framework 200.

Method 1200 begins at 1201. At 1202, a user starts a communication or collaboration application (e.g., 505A), such that platform 200 gets notified via API 205. At 1203, IHS 100 processes a video frame, for example, using media foundation engine 302. At 1204, method 1200 determines whether gaze and/or head-related transfer function (HRTF, a response that characterizes how an ear receives a sound from a point in space) is enabled, for example, by enforcement of an eye contact correction policy by optimizer application 506 and/or intelligent video plugin 507A in conjunction with platform framework 200.

If the eye contact correction policy does not apply (e.g., contextual rules are not met), then 1205 loads standard camera API settings and control passes to block 1213. Otherwise, if the eye contact correction policy applies (e.g., at least one contextual rule requiring eye contact correction is met), at 1206 optimizer application 506 receives a gaze vector from each of a plurality of cameras registered with platform framework 200 via API 205, as well as any intrinsic or preset weight values associated with each camera and/or gaze vector, for example, as provided in the eye contact correction policy.

In some embodiments, eye contact correction method 1200 may be based on the fusion of multiple sensors: multiple sensor stacks may be used to determine a user's gaze vector (CVF, etc.), such as, for example, audio input direction from microphone sources, as shown in 1207, and BLUETOOTH 5.1 angle of arrival and/or angle of departure direction(s) from a headset's operation, as shown in 1209.

Particularly, at 1207, method 1200 determines if a microphone array is on and/or registered with platform framework 200. If so, 1208 modifies a weight to be given to at least one of the gaze vectors based upon a difference between the direction of the user's gaze and the direction of their speech. At 1209, method 1200 determines if a BLUETOOTH 5.1 headset (or other wireless device with like capabilities) is on and/or registered with platform framework 200. If so, 1210 modifies a weight to be given to at least one of the gaze vectors based upon a difference between the direction of the user's gaze and the direction of the headset's angle of arrival and/or departure.

Additionally, or alternatively, method 1200 may modify a weight to be given to at least one of the gaze vectors based upon directional information obtained from a time-of-flight (ToF) sensor(s). Additionally, or alternatively, method 1200 may modify a weight to be given to at least one of the gaze vectors based upon the aforementioned contextual information.

At 1211, method 1200 calculates and/or updates the value of a weighted average gaze vector ($g_{ave}$) by taking in gaze vector inputs ($x_i$, $y_i$, $z_i$) from n sources or cameras and applying a weight to each gaze vector to calculate single most accurate gaze vector. For example, in the case of two cameras or video sources (n=2):

$$g_{ave} = \alpha * g_A + (1-\alpha) * g_B$$

where $g_i=(x_i, y_i, z_i)$, and $\alpha$=weight from 0.0 to 1.0.

In some embodiments, weight $\alpha$ may be an intrinsic weight based on calibrated accuracy and/or on the resolution of different cameras and/or other sensor inputs. This weight may be enhanced by operations 1208, 1210, and/or other context information as prescribed by the eye contact correction policy.

At 1212, optimizer application 506 and/or intelligent video plugin 507A sends an updated weighted average gaze vector ($g_{ave}$) to the communication or collaboration application (e.g., 505A), which in turn may switch the video feed between different cameras based upon a difference between the direction of the user's weight averaged gaze vector $g_{ave}$ and the relative positions of the different cameras (e.g., left or right, up or down, etc.). Additionally, or alternatively, optimizer application 506 and/or intelligent video plugin 507A may select the camera with which the user has best eye contact based on the weighted average gaze vector ($g_{ave}$), and it may notify the communication or collaboration application of its selection.

At 1203, method 1200 determines whether the user has ended the communication or collaboration session. If not, control returns to 1203. If so, method 1200 ends at 1214.

Accordingly, systems and methods described herein may enable the application of a weighted average to multiple eye gaze sensors as a method to determine camera-based gaze correction. Additionally, or alternatively, these systems and methods may enable the application of audio direction as weight for determining eye gaze direction. Additionally, or alternatively, these systems and methods may enable the application BT 5.1 angle of arrival and/or angle of departure methods as input weight for determining head position and/or eye gaze direction.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
a processor;
a sensor hub configured to determine a physical posture of the IHS; and
a memory coupled to the processor, the memory having program instructions stored thereon that, upon execution, cause the IHS to:
receive a notification, via a platform framework, of a communication session comprising of at least one of: a video communication, a virtual conference with video feed, or a remote meeting with video feed, wherein the communication session comprises a plurality of layers combined into a single video stream, and wherein the physical posture of the IHS determines a camera source of the IHS for use in the communication session, and wherein the camera source of the IHS used in the communication session comprises a front-facing camera and a rear-facing camera with respect to the IHS;
determine a physical posture of the IHS based on a hinge angle of the IHS, wherein the hinge angle measures an angle between a keyboard portion and a display portion of the IHS; and
in response to the notification and based on the determined physical posture of the IHS, apply a video or image mirroring operation, via the platform framework, to a layer of the communication session, wherein the video or image mirroring operation only changes an orientation of the layer, wherein the mirroring operation changing the orientation of the layer is activated based on a detected change in the hinge angle of the IHS that results in a change between use of the front-facing camera and the rear-facing camera.

2. The IHS of claim 1, wherein the content comprises at least one of: a live video feed, a recorded video, a virtual background, a watermark, a shared desktop, a shared application window, or a shared document.

3. The IHS of claim 1, wherein to apply the video or image mirroring operation, the program instructions, upon execution, cause the IHS to apply a left-to-right or a right-to-left flip to the layer of the content.

4. The IHS of claim 1, wherein to apply the video or image mirroring operation, the program instructions, upon execution, cause the IHS to determine whether to enforce a video or image mirroring policy based, at least in part, upon context.

5. The IHS of claim 4, wherein the context comprises a classification of the content.

6. The IHS of claim 4, wherein the context comprises an identity or role of an originator of the content.

7. The IHS of claim 4, wherein the context comprises a type of the communication session.

8. The IHS of claim 4, wherein the context comprises an identification or proximity of a participant of the communication session.

9. The IHS of claim 4, wherein the context comprises an IHS location.

10. The IHS of claim 4, wherein the context comprises an identification of a communication application configured to establish the communication session.

11. The IHS of claim 1, wherein the notification is provided by a communication application registered with the platform framework via an Application Programming Interface (API), and wherein application of the video or image mirroring operation is initiated by an optimizer application registered with the platform framework via the API.

12. A memory storage device having program instructions stored thereon that, upon execution by an Information Handling System (IHS), cause the IHS to:
determine a physical posture of the IHS based on sensor data collected and analyzed by a sensor hub of the IHS, wherein the sensor data comprises a hinge angle of the IHS, wherein the physical posture of the IHS determines a camera source of the IHS for use in a communication session hosted by the IHS, and wherein the camera source of the IHS used in the communication session comprises a front-facing camera and a rear-facing camera with respect to the IHS;

identify a video or image mirroring policy based on context information provided by at least one sensor coupled to the IHS for each layer of the communication session, wherein the communication session comprises at least a live video feed layer and a virtual background layer;

based on the determined physical posture of the IHS, wherein the posture of the IHS is determined based on the hinge angle that measures an angle between a keyboard portion and a display portion of the IHS, apply a video or image mirroring operation on each layer of the communication session, via a platform framework, during the communication session, wherein the mirroring operation is activated based on a detected change in the hinge angle of the IHS that results in a change between use of the front-facing camera and the rear-facing camera; and combine each layer of the communication session into a single video stream.

13. The memory storage device of claim 12, wherein to enforce the video or image mirroring policy, the program instructions, upon execution, cause the IHS to apply a left-to-right or a right-to-left operation to content shared during the communication session based on the context.

14. The memory storage device of claim 13, wherein the context comprises at least one of: a classification of the content, an identity or role of an originator of the content, a type of the communication session, an identification of a participant of the communication session, a proximity of the participant to the IHS, an IHS location, or a determination of whether a camera source is front-facing or rear-facing with respect to the IHS, or an identification of a communication application configured to establish the communication session.

15. A method, comprising:

determining a physical posture of an IHS (Information Handling System) based on sensor data collected and analyzed by a sensor hub of the IHS, wherein the sensor data comprises a hinge angle of the IHS, wherein the posture of the IHS is determined based on the hinge angle that measures an angle between a keyboard portion and a display portion of the IHS, wherein the physical posture of the IHS determines a camera source of the IHS for use in a communication session hosted by the IHS, and wherein the camera source of the IHS used in the communication session comprises a front-facing camera and a rear-facing camera with respect to the IHS;

identifying a video or image mirroring policy applicable to the communication session, wherein the video or imaging mirroring policy comprises a file containing one or more rules for deciding whether to change the orientation of a component or layer of the communication session based on the posture of the IHS that is determined based on the hinge angle, wherein each rule associates a layer with a desired orientation; and based on the determined physical posture of the IHS, applying a video or image mirroring operation with respect to content shared during the communication session, wherein enforcing the video or image mirroring policy comprises flipping pixels in only a portion of the content in the given component or layer of the video or image around a horizontal or vertical center axis, wherein the mirroring operation is activated based on a detected change in the hinge angle of the IHS that results in a change between use of the front-facing camera and the rear-facing camera.

16. The method of claim 15, wherein enforcing the video or image mirroring policy comprises selecting between a left-to-right or a right-to-left operation to the portion of the content based on context.

17. The method of claim 16, wherein the context comprises at least one of: a classification of the content, an identity or role of an originator of the content, a type of the communication session, an identification of a participant of the communication session, a proximity of the participant, a location, a determination of whether a camera source is front-facing or rear-facing, or an identification of a communication application configured to establish the communication session.

18. The method of claim 15, wherein the mirroring policy further comprises one or more rules for deciding whether to change the orientation of a layer of the communication session based on different video consumer applications that may be used in the communication session.

19. The method of claim 15, wherein the mirroring policy further comprises one or more rules for configuring processor cores of the IHS for use in applying the video or image mirroring operation.

* * * * *